United States Patent
Wakasugi et al.

(10) Patent No.: US 11,167,596 B2
(45) Date of Patent: Nov. 9, 2021

(54) TIRE

(71) Applicant: SUMITOMO RUBBER INDUSTRIES, LTD., Hyogo (JP)

(72) Inventors: Masashi Wakasugi, Hyogo (JP); Yuzo Kawasaki, Hyogo (JP); Takahiro Kawanoue, Hyogo (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 320 days.

(21) Appl. No.: 16/185,583

(22) Filed: Nov. 9, 2018

(65) Prior Publication Data

US 2019/0160878 A1    May 30, 2019

(30) Foreign Application Priority Data

Nov. 27, 2017 (JP) .............................. JP2017-226868
Dec. 25, 2017 (JP) .............................. JP2017-247298

(51) Int. Cl.
*B60C 11/03* (2006.01)
*B60C 11/12* (2006.01)

(52) U.S. Cl.
CPC ...... *B60C 11/0302* (2013.01); *B60C 11/0304* (2013.01); *B60C 11/0306* (2013.01);
(Continued)

(58) Field of Classification Search
None
See application file for complete search history.

(56) References Cited

U.S. PATENT DOCUMENTS

2009/0283188 A1* 11/2009 Itoh ..................... B60C 11/0309
                                                                    152/209.18
2013/0192731 A1*  8/2013 Oji ...................... B60C 11/0302
                                                                    152/209.8
(Continued)

FOREIGN PATENT DOCUMENTS

JP     2016-13820 A    1/2016
JP     2016-022800 A   2/2016
JP     2016-159861 A   9/2016

OTHER PUBLICATIONS

Search Report issued in European Patent Office (EPO) Patent Application No. 18205297.7, dated Mar. 29, 2019.
(Continued)

*Primary Examiner* — Alison L Hindenlang
*Assistant Examiner* — Olukorede Esan
(74) *Attorney, Agent, or Firm* — Greenblum & Bernstein, P.L.C.

(57) ABSTRACT

The tire comprises a tread portion whose position when mounted on a vehicle is specified and having an asymmetric pattern with respect to a tire equator. The tread portion includes an outer shoulder main groove, an outer crown main groove, an inner crown main groove, an outer crown land region, and a center crown land region. The outer crown land region is provided with first outer crown sipes and second outer crown sipes. The center crown land region is provided with first center crown sipes and second center crown sipes. Each of the second outer crown sipes is arranged so as to be smoothly continuous with a respective one of the first center crown sipes with the outer crown main groove therebetween.

20 Claims, 15 Drawing Sheets

(52) U.S. Cl.
CPC ...... *B60C 11/1204* (2013.01); *B60C 11/1236* (2013.01); *B60C 11/1263* (2013.01); *B60C 11/1281* (2013.01); *B60C 2011/0341* (2013.01); *B60C 2011/0355* (2013.01); *B60C 2011/0358* (2013.01); *B60C 2011/1254* (2013.01)

(56) References Cited

U.S. PATENT DOCUMENTS

| | | | |
|---|---|---|---|
| 2014/0230982 A1* | 8/2014 | Ninomiya | B60C 11/0306 152/209.22 |
| 2014/0283967 A1* | 9/2014 | Inoue | B60C 11/0306 152/209.18 |
| 2015/0174966 A1* | 6/2015 | Todoroki | B60C 11/04 152/209.18 |
| 2015/0210121 A1* | 7/2015 | Sanae | B60C 11/1204 152/209.8 |
| 2015/0258858 A1* | 9/2015 | Kujime | B60C 11/1369 152/209.8 |
| 2017/0320360 A1* | 11/2017 | Yamakawa | B60C 11/1236 |
| 2018/0215206 A1* | 8/2018 | Kuriyama | B60C 11/1236 |

OTHER PUBLICATIONS

U.S. Appl. No. 16/185,702 to Mahito Arai et al., filed Nov. 9, 2018.
U.S. Appl. No. 16/185,728 to Masashi Wakasugi, filed Nov. 9, 2018.

* cited by examiner

TIRE

TECHNICAL FIELD

The present invention relates to a tyre provided with a crown sipe.

BACKGROUND ART

Japanese Unexamined Patent Application Publication No. 2016-13820 has proposed providing a shoulder sipe extending in a tyre axial direction in a shoulder land region of a pneumatic tyre in order to suppress uneven wear of the shoulder land region.

However, in recent years, as vehicle performance is improved, not only improvement of anti-wear performance but also further improvement of steering stability are required. As a result of various experiments, inventors of the present invention obtained a finding that the steering stability can be improved while maintaining wear resistance of a crown land region by improving a crown sipe provided in the crown land region.

SUMMARY OF THE INVENTION

The present invention was made in view of the above, and a primary object thereof is to provide a tyre capable of exerting excellent steering stability while suppressing the uneven wear of the crown land region.

In one aspect of the present invention, a tyre comprises a tread portion whose position when mounted on a vehicle is specified and having an asymmetric pattern with respect to a tyre equator, wherein the tread portion comprises an outer shoulder main groove extending continuously in a tyre circumferential direction, an outer crown main groove extending adjacently to the outer shoulder main groove and continuously in the tyre circumferential direction, an inner crown main groove extending adjacently to the outer crown main groove and continuously in the tyre circumferential direction, an outer crown land region defined between the outer shoulder main groove and the outer crown main groove, and a center crown land region defined between the outer crown main groove and the inner crown main groove, the outer crown land region is provided with first outer crown sipes each completely crossing the outer crown land region and second outer crown sipes each extending from the outer crown main groove toward the outer shoulder main groove and terminating within the outer crown land region, the center crown land region is provided with first center crown sipes each completely crossing the center crown land region, and second center crown sipes each extending from the inner crown main groove toward the outer crown main groove and terminating within the center crown land region, and each of the second outer crown sipes is arranged so as to be smoothly continuous with a respective one of the first center crown sipes with the outer crown main groove therebetween.

In another aspect of the invention, it is preferred that the tread portion further comprises an inner shoulder main groove extending adjacently to the inner crown main groove and continuously in the tyre circumferential direction, and an inner crown land region defined between the inner shoulder main groove and the inner crown main groove, the inner crown land region is provided with a plurality of crown lateral grooves each extending from the inner shoulder main groove toward the inner crown main groove with a width of not less than 1.5 mm and having an inner end terminating within the inner crown land region and first inner crown sipes each extending between the inner end of a respective one of the crown lateral grooves and the inner crown main groove with a width of less than 1.5 mm, and each of the first inner crown sipes is arranged so as to be smoothly continuous with a respective one of the second center crown sipes with the inner crown main groove therebetween.

In another aspect of the invention, it is preferred that the inner crown land region is provided with a plurality of second inner crown sipes each extending from the inner shoulder main groove toward the inner crown main groove with a width of less than 1.5 mm and having an inner end terminating within the inner crown land region.

In another aspect of the invention, it is preferred that a length in a tyre axial direction of each of the crown lateral grooves is larger than a length in the tyre axial direction of each of the second inner crown sipes.

In another aspect of the invention, it is preferred that the inner crown land region is provided with a plurality of third inner crown sipes each extending from the inner crown main groove toward the inner shoulder main groove with a width of less than 1.5 mm and having an outer end terminating within the inner crown land region.

In another aspect of the invention, it is preferred that each of the third inner crown sipes is arranged so as to be smoothly continuous with a respective one of the first center crown sipes with the inner crown main groove therebetween.

In another aspect of the invention, it is preferred that each of the third inner crown sipes is curved so as to be convex toward on side in the tyre circumferential direction, and each of the first center crown sipes is curved so as to be convex toward the other side in the tyre circumferential direction.

In another aspect of the invention, it is preferred that each of the third inner crown sipes is curved with a radius of curvature smaller than that of each of the first center crown sipes.

In another aspect of the invention, it is preferred that each of the first inner crown sipes is curved so as to be convex toward one side in the tyre circumferential direction, and each of the second center crown sipes is curved so as to be convex toward the other side in the tyre circumferential direction.

In another aspect of the invention, it is preferred that each of the first inner crown sipes is curved with a radius of curvature smaller than that of each of the second center crown sipes.

In another aspect of the invention, it is preferred that in a connecting portion of each of the first outer crown sipes with the outer crown main groove, a portion between at least one of sipe walls thereof and a tread ground contacting surface is chamfered so that a width thereof gradually increases toward the outer crown main groove.

In another aspect of the invention, it is preferred that in a connecting portion of each of the first center crown sipes with the outer crown main groove, a portion between at least one of sipe walls thereof and the tread ground contacting surface is chamfered so that a width thereof gradually increases toward the outer crown main groove.

In another aspect of the invention, it is preferred that in a connecting portion of each of the first outer crown sipe with the outer crown main groove, one of sipe walls thereof on one side in the tyre circumferential direction is chamfered, and in a connecting portion of each of the first center crown sipes with the outer crown main groove, one of sipe walls thereof on the other side in the tyre circumferential direction is chamfered.

In another aspect of the invention, it is preferred that in a connecting portion of each of the first center crown sipes with the inner crown main groove, a portion between at least one of sipe walls thereof and the tread ground contacting surface is chamfered so that a width thereof gradually increases toward the inner crown main groove.

In another aspect of the invention, it is preferred that each of the first outer crown sipes includes a narrow sipe portion and a wide sipe portion having a width larger than that of the narrow sipe portion.

In another aspect of the invention, it is preferred that the wide sipe portion is connected with the outer shoulder main groove.

In another aspect of the invention, it is preferred that a length in the tyre axial direction of the narrow sipe portion is larger than a length in the tyre axial direction of the wide sipe portion.

In another aspect of the invention, it is preferred that a depth of the wide sipe portion is larger than a depth of the narrow sipe portion.

In another aspect of the invention, it is preferred that each of the second outer crown sipes includes a first sipe portion and a second sipe portion having a depth smaller than that of the first sipe portion.

In another aspect of the invention, it is preferred that each of the second center crown sipes terminates within the center crown land region without crossing the tyre equator.

In one aspect of the present invention, the tyre comprises the tread portion whose position when mounted on a vehicle is specified and having the asymmetric pattern with respect to the tyre equator. The tread portion of one aspect of the present invention comprises the outer shoulder main groove extending continuously in the tyre circumferential direction, the outer crown main groove extending adjacently to the outer shoulder main groove and continuously in the tyre circumferential direction, the inner crown main groove extending adjacently to the outer crown main groove and continuously in the tyre circumferential direction, the outer crown land region defined between the outer shoulder main groove and the outer crown main groove, and the center crown land region defined between the outer crown main groove and the inner crown main groove. In the tyre configured as such, relatively large ground contact pressure tends to be applied to the outer crown land region and the center crown land region during running straight and during cornering, therefore, the sipes arranged in these land regions greatly contribute to uneven wear resistance performance and the steering stability.

The center crown land region of the tyre of one aspect of the present invention is provided with the first center crown sipes each completely crossing the center crown land region, and the second center crown sipes each extending from the inner crown main groove toward the outer crown main groove and terminating within the center crown land region, The center crown land region configured as such exerts the same effects as the outer crown land region described above, therefore, it is possible that the steering stability is improved.

DESCRIPTION OF THE PREFERRED EMBODIMENT

An embodiment of the present invention will now be described below in detail in conjunction with accompanying drawings.

Figure 1:
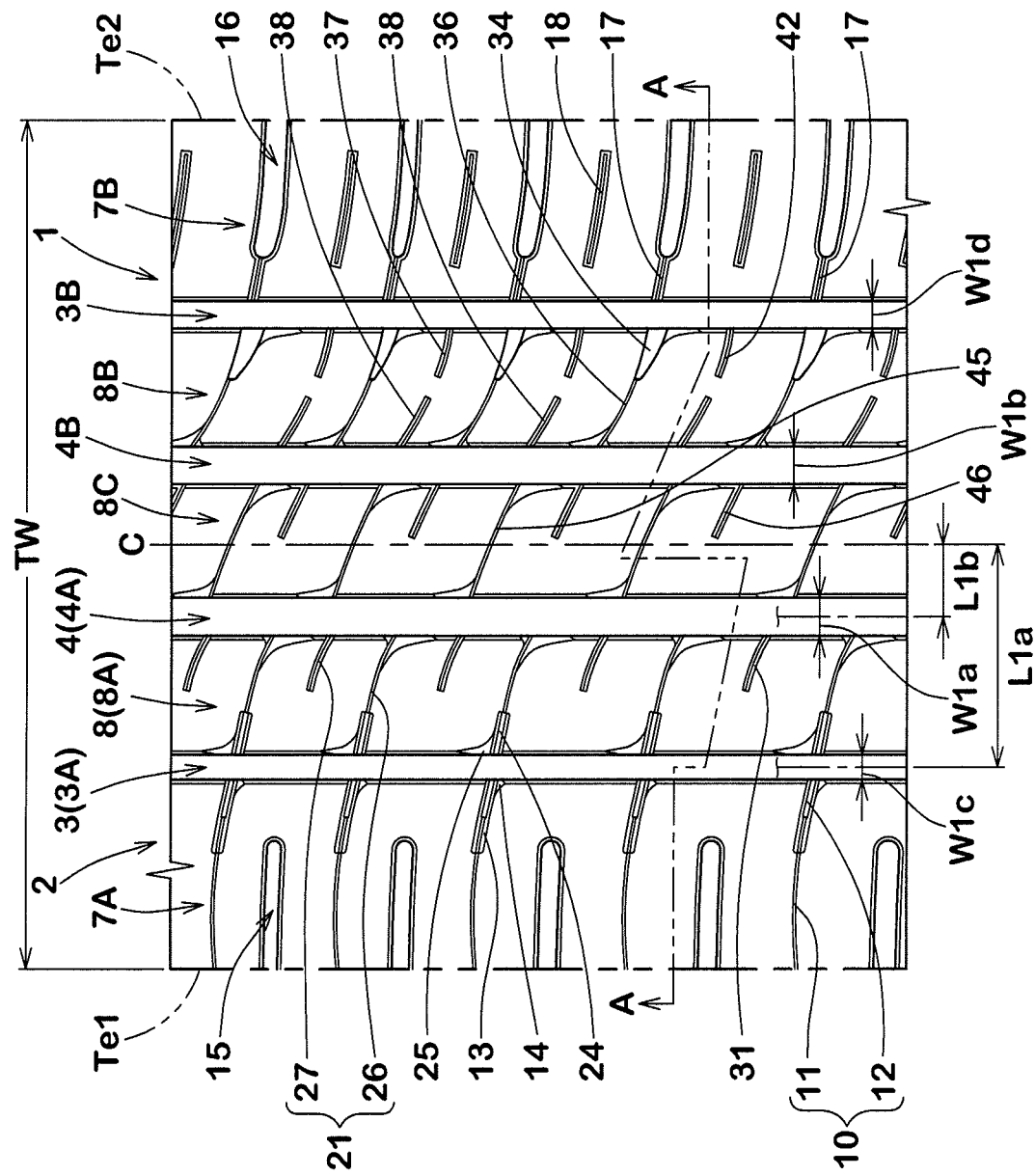
FIG. 1 is a development view of a tread portion of a tyre as an embodiment of the present invention.

FIG. 1 is a development view of a tread portion 2 of a tyre 1 showing an embodiment of the present invention. The tyre 1 in this embodiment can be used for various tyres such as a pneumatic tyre for a passenger car and for heavy load, and a non-pneumatic tyre not filled with pressurized air therein, for example. The tyre 1 in this embodiment is suitably used as a pneumatic tyre for a passenger car, for example.

As shown in FIG. 1, the tyre 1 in this embodiment has the tread portion 2 whose position when mounted on a vehicle is specified and having an asymmetric pattern with respect to the tyre equator. The tread portion 2 has a first tread edge (Te1) located, when the tyre 1 is mounted on a vehicle, on an outer side of the vehicle and a second tread edge (Te2) located on an inner side of the vehicle when the tyre is mounted on the vehicle, for example. The mounting position of the tyre 1 on a vehicle is indicated by a letter or a symbol on one of sidewall portions (not shown), for example.

In a case of a pneumatic tyre, the tread edges (Te1) and (Te2) are defined as outermost ground contacting positions in a tyre axial direction of the tyre 1 when the tyre 1 in a standard state is in contact with a flat surface with zero camber angle by being loaded with a standard tyre load. The standard state is a state in which the tyre is mounted on a standard rim, inflated to a standard inner pressure, and loaded with no tyre load. In this specification, unless otherwise noted, dimensions and the like of various parts of the tyre are values measured in the standard state.

The "standard rim" is a wheel rim specified for the concerned tyre by a standard included in a standardization system on which the tyre is based, for example, the "normal wheel rim" in JATMA, "Design Rim" in TRA, and "measuring Rim" in ETRTO.

The "standard pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tyre load specified for the concerned tyre by a standard included in a standardization system on which the tyre is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

In the tread portion 2 in this embodiment, main grooves extending continuously in a tyre circumferential direction are provided, for example. The main grooves include a shoulder main groove 3 provided between the first tread edge (Te1) and a tyre equator (C) or between the second tread edge (Te2) and the tyre equator (C), and a crown main groove 4 arranged adjacently to the shoulder main groove 3, for example.

The shoulder main groove 3 in this embodiment includes an outer shoulder main groove 3A provided between the first tread edge (Te1) and the tyre equator (C), and an inner shoulder main groove 3B provided between the second tread edge (Te2) and the tyre equator (C), for example.

It is preferred that each of the shoulder main grooves 3 is arranged so that a distance (L1a) between a groove center line thereof and the tyre equator (C) is in the range of from 0.20 to 0.30 times a tread width TW, for example. The tread width TW is a distance in the tyre axial direction in the standard state between the first tread edge (Te1) and the second tread edge (Te2).

The crown main groove 4 includes an outer crown main groove 4A and an inner crown main groove 46. The outer crown main groove 4A is provided between the tyre equator (C) and the outer shoulder main groove 3A. The inner crown main groove 4B is provided between the tyre equator (C) and the inner shoulder main groove 3B.

It is preferred that the crown main groove 4 is formed such that a distance (L1b) from a groove center line thereof and the tyre equator (C) is in the range of from 0.05 to 0.15 times the tread width TW, for example.

It is preferred that each of a groove width (W1a) of the outer crown main groove 4A and a groove width (W1b) of the inner crown main groove 4B is larger than each of a groove width (W1c) of the outer shoulder main groove 3A and a groove width (W1d) of the inner shoulder main groove 3B, for example. Specifically, it is preferred that each of the groove width (W1a) of the outer crown main groove 4A and the groove width (W1b) of the inner crown main groove 4B is in the range of from 1.25 to 1.35 times the groove width (W1b) of the outer shoulder main groove 3A. Thereby, it is possible that excellent wet performance is obtained.

It is preferred that the groove width (W1d) of the inner shoulder main groove 3B is greater than the groove width (W1c) of the outer shoulder main groove 3A, for example. Specifically, it is preferred that the groove width (W1d) of the inner shoulder main groove 3B is in the range of from 1.20 to 1.28 times the groove width (W1c) of the outer shoulder main groove 3A.

In order to improve the steering stability on a dry road surface and the wet performance in a good balance, it is preferred that the groove width (W1a) of the outer crown main groove 4A, the groove width (W1b) of the inner crown main groove 4B, and the groove width (W1c) of the outer shoulder main groove 3A and the groove width (W1d) of the inner shoulder main groove 3B are each in the range of from 2.5% to 5.0% of the tread width TW, for example. Note that when dimensions of the grooves are shown in this specification, the dimensions not including chamfers are shown.

Figure 2:
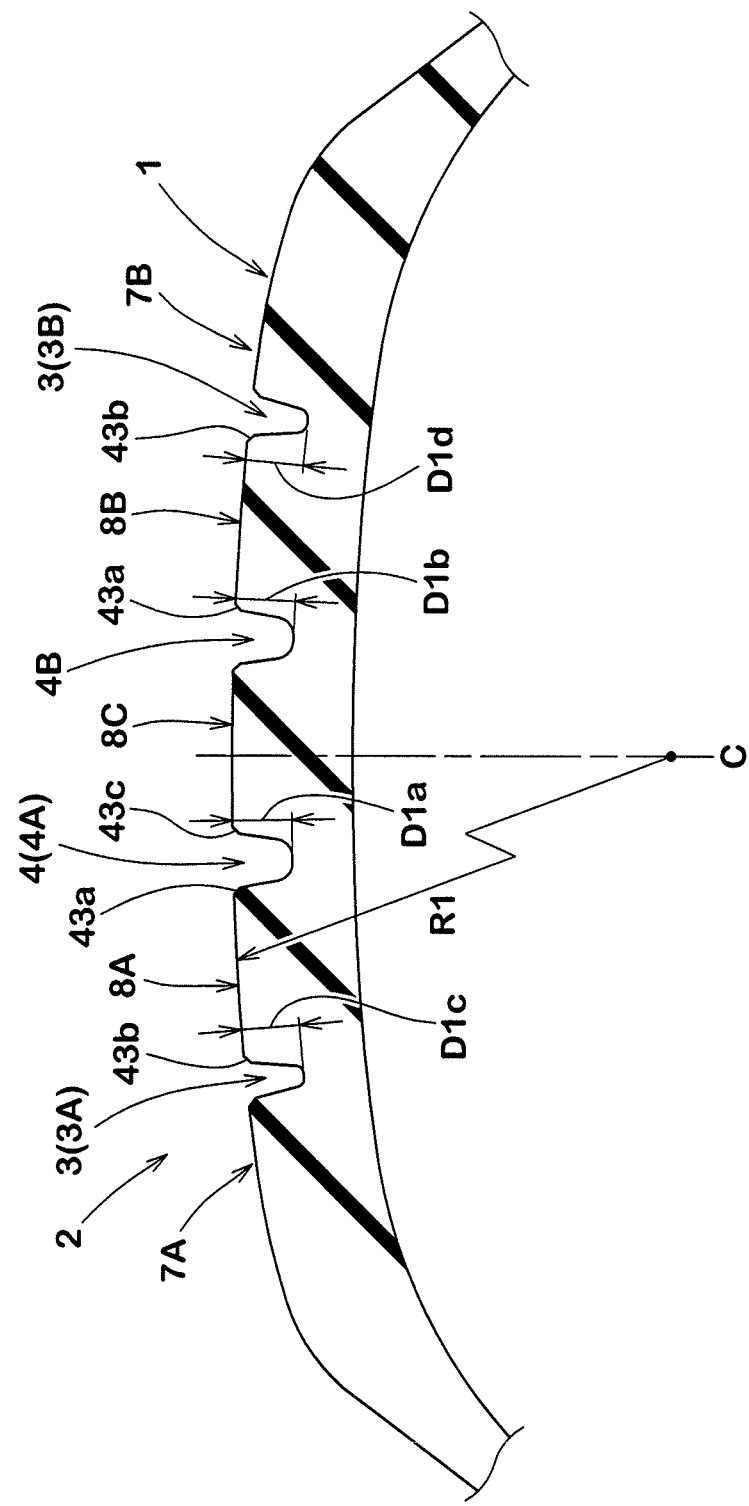
FIG. 2 is a cross-sectional view taken along A-A line of FIG. 1.

FIG. 2 is a cross-sectional view taken along A-A line of FIG. 1. As shown in FIG. 2, a groove depth (D1a) of the outer crown main groove 4A, a groove depth (D1b) of the inner crown main groove 4B, a groove depth (D1c) of the outer shoulder main groove 3A and a groove depth (D1d) of the inner shoulder main groove 3B are in the range of from 6.0 to 12.0 mm, for example.

As shown in FIG. 1, the tread portion 2 in this embodiment is divided by the main grooves described above into an outer shoulder land region 7A, an inner shoulder land region 7B, an outer crown land region 8A, an inner crown land region 8B, and a center crown land region 8C. The outer shoulder land region 7A is defined between the first tread edge (Te1) and the outer shoulder main groove 3A. The inner shoulder land region 7B is defined between the second tread edge (Te2) and the inner shoulder main groove 3B. The outer crown land region 8A is defined between the outer shoulder main groove 3A and the outer crown main groove 4A. The inner crown land region 8B is defined between the inner shoulder main groove 3B and the inner crown main groove 4B. The center crown land region 8C is defined between the outer crown main groove 4A and the inner crown main groove 4B.

Figure 3:
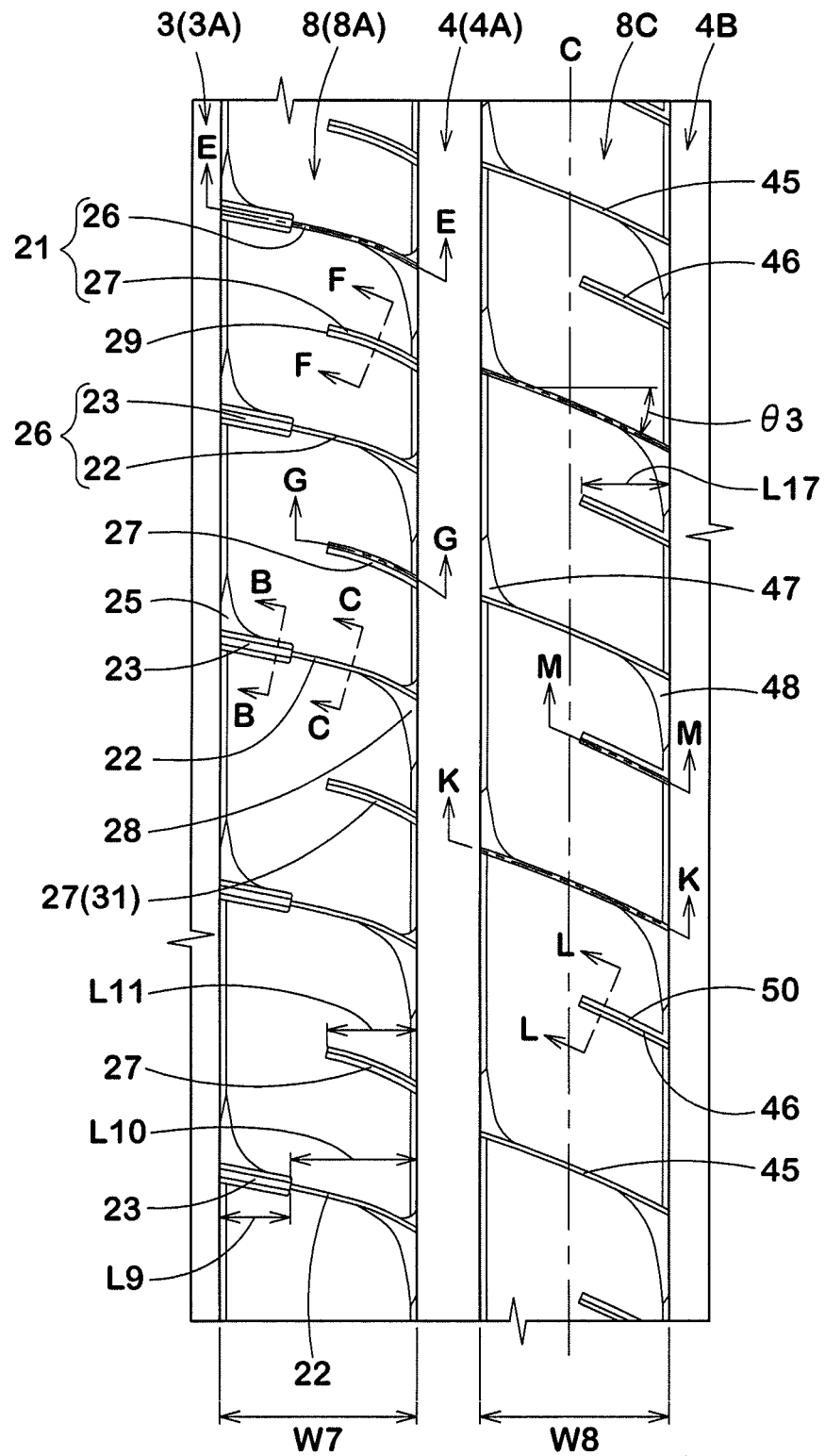
FIG. 3 is an enlarged view of an outer crown land region and a center crown land region of FIG. 1.

FIG. 3 is an enlarged view of the outer crown land region 8A and the center crown land region 8C. As shown in FIG. 3, outer crown land region 8A is provided with first outer crown sipes 26 and second outer crown sipes 27. In this specification, the term "sipe" means a groove having a width of less than 1.5 mm.

Each of the first outer crown sipes 26 completely crosses the outer crown land region 8A. Each of the second outer crown sipes 27 extends from the outer crown main groove 4A toward the outer shoulder main groove 3A and terminates within the outer crown land region 8A. The first outer crown sipes 26 and the second outer crown sipes 27 moderate deformation of the outer crown land region 8A at the time of contacting the ground, therefore, the uneven wear thereof is suppressed. Further, the second outer crown sipes 27 together with the first outer crown sipes 26 further moderate the rigidity of a part on the side of the outer crown main groove 4A of the outer crown land region 8A. Therefore, it is made easy for the outer crown land region 8A to follow the road surface even in an early stage of cornering in which the ground contact pressure is not sufficiently increased, for example, thereby, excellent initial responsiveness is obtained eventually.

On the other hand, the second outer crown sipes 27 terminate within the outer crown land region 8A, therefore, the outer crown land region 8A has high rigidity in a part thereof on the side of the outer shoulder main groove 3A. Thereby, the outer crown land region 8A exerts large cornering force in a middle stage of cornering when sufficient ground contacting load is applied to the tyre, for example, therefore, it is possible that the steering stability is improved eventually.

The center crown land region 8C is provided with first center crown sipes 45 and second center crown sipes 46. Each of the first center crown sipes 45 completely crosses the center crown land region 8C. Each of the second center crown sipes 46 extends from the inner crown main groove 4B toward the outer crown main groove 4A and terminates within the center crown land region 8C.

The first center crown sipes 45 and the second center crown sipes 46 moderate deformation of the center crown land region 8C at the time of contacting the ground, therefore, the uneven wear thereof is suppressed. Further, the second center crown sipes 46 together with the first center crown sipes 45 further moderate the rigidity of a part on the side of the inner crown main groove 4B of the center crown land region 8C. Thereby, it is made easy for the center crown land region 8C to follow the road surface even in an early stage of cornering in which the ground contact pressure is not sufficiently increased, for example, therefore, excellent initial responsiveness is obtained eventually.

On the other hand, the second center crown sipes 46 terminate within the center crown land region 8C, therefore, the center crown land region 8C has high rigidity in a part thereof on the side of the outer shoulder main groove 3A. Thereby, the center crown land region 8C exerts large cornering force in the middle stage of cornering when sufficient ground contacting load is applied to the tyre, for example, therefore, it is possible that the steering stability is improved eventually.

Figure 4:
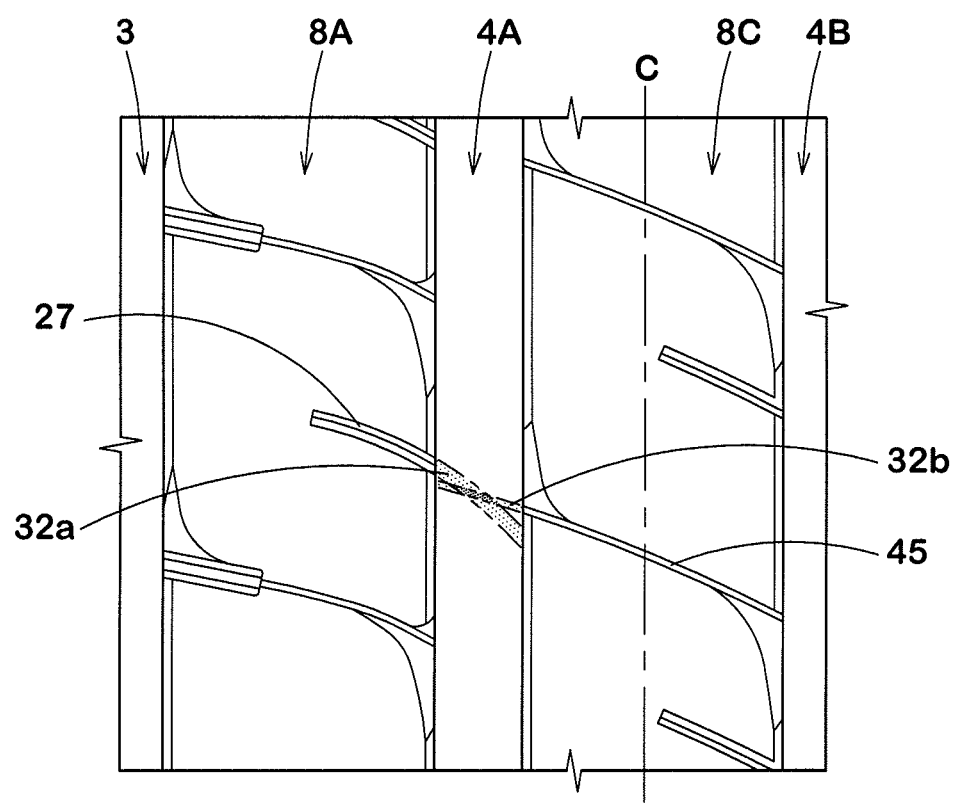
FIG. 4 is an enlarged view of one of second outer crown sipes and first center crown sipes of FIG. 3.

FIG. 4 is an enlarged view of one of the second outer crown sipes 27 and the first center crown sipes 45. As shown in FIG. 4, in this embodiment, each of the second outer crown sipes 27 is arranged at a position so as to be smoothly continuous with a respective one of the first center crown sipes 45 with the outer crown main groove 4A therebetween. Note that the sipe being "provided at a position so as to be smoothly continuous" with another sipe at least includes an embodiment in which a minimum separation distance in the tyre circumferential direction between a first region (32a) obtained by virtually extending one of the sipes and a second region (32b) obtained by virtually extending the other one of the sipes is less than 1.0 mm. In this embodiment, the first region (32a) and the second region (32b) at least partially intersect with each other (that is, the minimum separation distance=0). In a more preferred embodiment, the first region (32a) intersects with an end portion of the other one of the sipes and the second region (32b) intersects with an end portion of the one of the sipes.

In this embodiment, due to the arrangement of the sipes described above, it is made easy for the first outer crown sipes 26 and the first center crown sipes 45 to open, therefore, the rigidity is moderated in a part on the side of the outer crown main groove 4A of each of the outer crown land region 8A and the center crown land region 8C, thereby, it is possible that further excellent initial responsiveness is obtained.

As shown in FIG. 3, each of the first outer crown sipes 26 includes a narrow sipe portion 22 and a wide sipe portion 23 having a width larger than that of the narrow sipe portion 22, for example. The wide sipe portion 23 is connected with the outer shoulder main groove 3A, for example. The narrow sipe portion 22 has the width in the range of from 0.4 to 0.8 mm, for example. The width of the wide sipe portion 23 is preferably in the range of from 1.50 to 1.80 times, more preferably in the range of from 1.60 to 1.70 times the width of the narrow sipe portion 22, and specifically, preferably in the range of from 0.8 to 1.2 mm, for example.

The wide sipe portion 23 can moderate the rigidity of a surrounding land part more than the narrow sipe portion 22. On the other hand, in the outer crown land region 8A, variation of the ground contacting load during running is larger in a part on a side of the outer shoulder main groove 3A than in a part on a side of the outer crown main groove 4A, therefore, uneven wear is more likely to occur due to minute slippage of the ground contacting surface. In this embodiment, by providing the wide sipe portions 23 in this region, it is made easy for the surrounding land parts to follow the road surface, therefore, it is possible that the minute slippage is suppressed, thereby, it is possible that the uneven wear of the outer crown land region 8A is eventually further suppressed.

Further, in the outer crown land region 8A, the land parts around the wide sipe portions 23 are likely to follow the road surface even in a state of early stage of cornering in which the ground contacting load is not sufficiently increased, for example, therefore, it is possible that the initial responsiveness is increased as well.

Furthermore, in the outer crown land region 8A, the land parts around the narrow sipe portions 22 provide higher rigidity than the land parts around the wide sipe portions 23, therefore, large cornering force is exerted, thereby, it is possible that the steering stability is eventually improved.

Figure 5A:
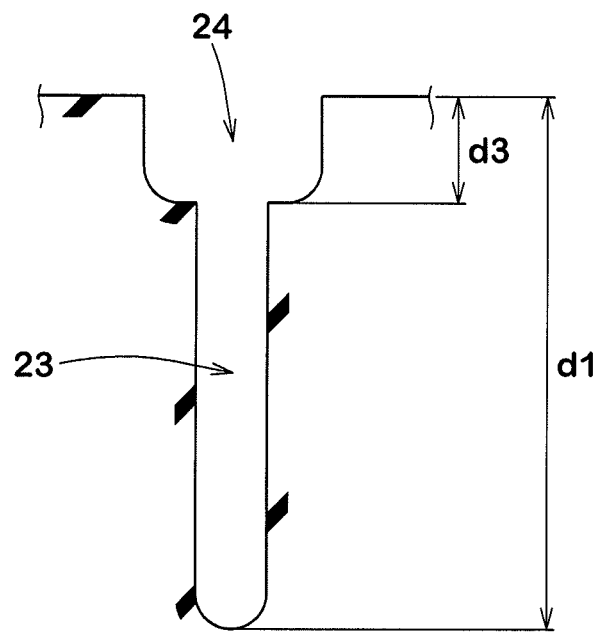
FIG. 5A is a cross-sectional view taken along B-B line of FIG. 3.
Figure 5B:
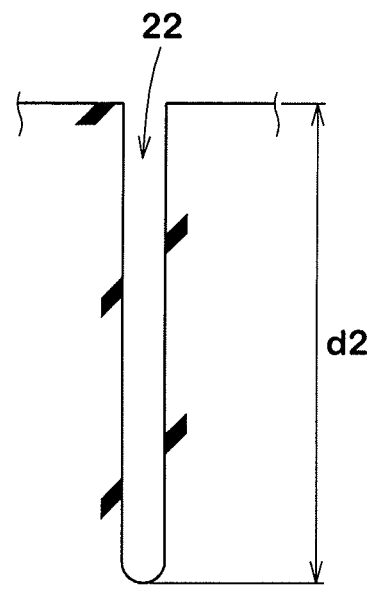
FIG. 5B is a cross-sectional view taken along C-C line of FIG. 3.

FIG. 5A is a cross-sectional view of one of the wide sipe portions 23 taken along B-B line of FIG. 3. FIG. 5B is a cross-sectional view of one of the narrow sipe portions 22 taken along C-C line of FIG. 3. As shown in FIGS. 5A and 5B, it is preferred that a depth (d1) of each of the wide sipe portions 23 is larger than a depth (d2) of each of the narrow sipe portions 22. Specifically, the depth (d1) of each of the wide sipe portions 23 is preferably not less than 1.03 times, more preferably not less than 1.06 times, and preferably not more than 1.15 times, more preferably not more than 1.12 times the depth (d2) of each of the narrow sipe portions 22. Note that the depths (d1) and (d2) each correspond to a distance along a depth direction of the sipe between a ground contacting surface of the land region and a bottom of the sipe, for example.

As shown in FIGS. 3 and 5A, it is preferred that the outer crown land region 8A is provided with narrow groove portions 24 each having a groove width of not less than 1.5 mm and a groove depth of not more than 2.0 mm, and that the wide sipe portion 23 extends inwardly in a tyre radial direction from a groove bottom of each of the narrow groove portions 24. A depth (d3) of each of the narrow groove portions 24 is in the range of from 1.0 to 2.0 mm, for example. It is possible that the narrow groove portions 24 and the wide sipe portions 23 configured as such further improve the uneven wear resistance performance.

As shown in FIG. 3, it is preferred that, in a connecting portion of each of the narrow groove portions 24 with the outer shoulder main groove 3A, a portion between at least one of groove walls thereof and the tread ground contacting surface is chamfered so that the groove width thereof gradually increases toward the outer shoulder main groove 3A. Each of the narrow groove portions 24 provided in the outer crown land region 8A has a chamfered portion 25 provided in one of the groove walls thereof.

It is preferred that a length L9 in the tyre axial direction of each of the wide sipe portions 23 is in the range of from 0.30 to 0.40 times a width w7 of the outer crown land region 8A, for example.

Each of the narrow sipe portions 22 is connected with the outer crown main groove 4A, for example. It is preferred that a length L10 in the tyre axial direction of each of the narrow sipe portions 22 is greater than the length L9 in the tyre axial direction of each of the wide sipe portions 23. The length L10 of each of the narrow sipe portions 22 is in the range of from 1.60 to 1.80 times the length L9 of each of the wide sipe portions 23, for example. With the wide sipe portions 23 and the narrow sipe portions 22 configured as such, it is possible that large cornering force is obtained while excellent initial responsiveness is exerted.

It is preferred that, in a connecting portion of each of the narrow sipe portions 22 with the crown main groove 4, a portion between at least one of sipe walls and the tread ground contacting surface is chamfered so that a width thereof gradually increases toward the outer crown main groove 4A. In this embodiment, a chamfered portion 28 is provided on the sipe wall on the opposite side (the lower side in FIG. 3) to the chamfered portion 25 provided on the groove wall of each of the narrow groove portions 24. The chamfered portions 28 configured as such decrease air column resonance sound of the outer crown main groove 4A, therefore, it is possible that noise performance is eventually improved.

Figure 6A:
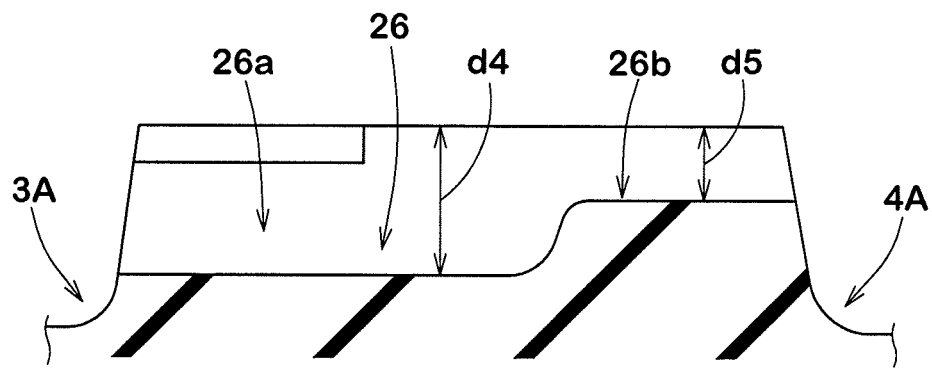
FIG. 6A is a cross-sectional view taken along E-E line of FIG. 3.

FIG. 6A is a cross-sectional view of one of the first outer crown sipes 26 taken along E-E line of FIG. 3. As shown in FIG. 6A, each of the first outer crown sipes 26 includes a first sipe portion (26a) arranged on a side of the outer shoulder main groove 3A and a second sipe portion (26b) arranged on a side of the outer crown main groove 4A, for example. The second sipe portion (26b) has a smaller depth than the first sipe portion (26a), for example. A depth (d5) of the second sipe portion (26b) is in the range of from 0.45 to 0.55 times a depth (d4) of the first sipe portion (26a), for example. The first outer crown sipes 26 configured as such maintain the rigidity of a portion of the outer crown land region 8A on a side of the tyre equator (C) while improving the initial responsiveness, therefore, it is possible that further excellent steering stability is exerted.

As shown in FIG. 3, a length L11 in the tyre axial direction of each of the second outer crown sipes 27 is in the range of from 0.35 to 0.55 times, preferably in the range of from 0.42 to 0.48 times the width w7 in the tyre axial direction of the outer crown land region 8A, for example. Further, it is preferred that terminating ends 29 of the second outer crown sipes 27 are located closer to the crown main groove 4 than end portions on the side of the crown main groove 4 of the wide sipe portions 23 of the first outer crown sipes 26. The second outer crown sipes 27 configured as such suppress excessive decrease in the rigidity of the outer crown land region 8A, therefore, it is possible that large cornering force is provided.

It is preferred that each of the second outer crown sipes 27 is curved so as to be convex toward either side in the tyre circumferential direction, for example. It is preferred that a radius of curvature of each of the second outer crown sipes 27 is in the range of from 70 to 90 mm, for example.

Figure 6B:
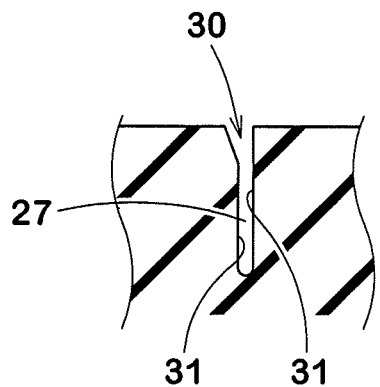
FIG. 6B is a cross-sectional view taken along F-F line of FIG. 3.

FIG. 6B is a cross-sectional view of one of the second outer crown sipes 27 taken along F-F line orthogonal thereto of FIG. 3. As shown in FIG. 6B, it is preferred that each of the second outer crown sipes 27 has an opening portion 30 having a width increasing outwardly in the tyre radial direction, for example. In this embodiment, one of sipe walls 31 on one side in the tyre circumferential direction of each of the second outer crown sipes 27 is inclined, whereby the opening portion 30 is formed. The sipe walls 31 on both sides may be inclined in each of the second outer crown sipes 27, for example. Further, the second outer crown sipes 27 may be respectively provided at the groove bottoms of the narrow groove portions described above, for example.

Figure 6C:
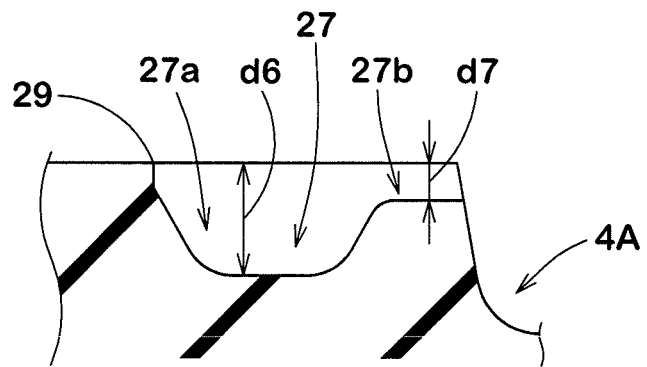
FIG. 6C is a cross-sectional view taken along G-G line of FIG. 3.

FIG. 6C is a cross-sectional view taken along G-G line along one of the second outer crown sipes 27 of FIG. 3. As shown in FIG. 6C, it is preferred that each of the second outer crown sipes 27 includes a first sipe portion (27a) arranged on a side of the terminating end 29 and a second sipe portion (27b) arranged on the side of the outer crown main groove 4A. The second sipe portion (27b) has a smaller depth than the first sipe portion (27a), for example. It is preferred that a depth (d7) of the second sipe portion (27b) is in the range of from 0.45 to 0.55 times a depth (d6) of the first sipe portion (27a), for example. Each of the second outer crown sipes 27 configured as such suppresses a portion thereof on the side of the outer crown main groove 4A from being excessively opened, therefore, it is possible that the uneven wear resistance performance and the steering stability are improved.

As shown in FIG. 3, the first center crown sipes 45 are inclined with respect to the tyre axial direction. It is preferred that an angle 83 of each of the first center crown sipes 45 with respect to the tyre axial direction is in the range of from 10 to 30 degrees, for example.

It is preferred that each of the first center crown sipes 45 is curved so as to be convex toward either side in the tyre circumferential direction, for example. The first center crown sipes 45 in this embodiment are convex toward the same direction as the second outer crown sipes 27, for example. It is preferred that a radius of curvature of each of the first center crown sipes 45 is larger than a radius of curvature of each of the second outer crown sipes 27, for example. It is preferred that the radius of curvature of each of the first center crown sipes 45 is in the range of from 140 to 160 mm, for example. The first center crown sipes 45 configured as such are helpful for suppressing the uneven wear of the center crown land region 8C.

It is preferred that, in a connecting portion of each of the first center crown sipes 45 with the outer crown main groove 4A, a portion between at least one of sipe walls and the tread ground contacting surface is chamfered so that the width thereof gradually increases toward the outer crown main groove 4A. Similarly, it is preferred that, in a connecting portion of each of the first center crown sipes 45 with the inner crown main groove 4B, a portion between at least one of sipe walls and the tread ground contacting surface is chamfered so that the width thereof gradually increases toward the inner crown main groove 4B. It is preferred that a chamfered portion 48 provided on the side of the inner crown main groove 4B is arranged on the opposite side in the tyre circumferential direction to a chamfered portion 47 provided on the side of the outer crown main groove 4A with respect to each of the first center crown sipes 45.

In a further preferred embodiment, in a connecting portion of each of the first outer crown sipes 26 with the outer crown main groove 4A, one of the sipe walls thereof on one side (the lower side in FIG. 3) in the tyre circumferential direction is chamfered and in a connecting portion of each of the first center crown sipes 45 with the outer crown main groove 4A, one of the sipe walls thereof on the other side (the upper side in FIG. 3) in the tyre circumferential direction is chamfered. Thereby, it is possible that the air column resonance sound of the outer crown main groove 4A is decreased.

Figure 7A:
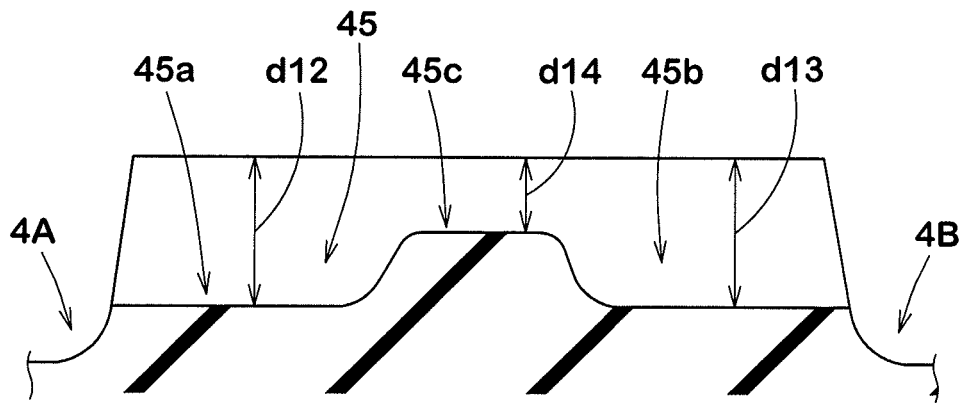
FIG. 7A is a cross-sectional view taken along K-K line of FIG. 3.

FIG. 7A is a cross-sectional view of one of the first center crown sipes 45 taken along K-K line of FIG. 3. As shown in FIG. 7A, it is preferred that each of the first center crown sipes 45 includes a first sipe portion (45*a*), arranged on a side of the outer crown main groove 4A, a second sipe portion (45*b*) arranged on a side of the inner crown main groove 4B, and a third sipe portion (45*c*) arranged between the first sipe portion (45*a*) and the second sipe portion (45*b*).

It is preferred that a depth (d12) of the first sipe portion (45*a*) and a depth (d13) of the second sipe portion (45*b*) are each in the range of from 0.60 to 0.75 times the groove depth (D1*a*) (shown in FIG. 2) of the outer crown main groove 4A, for example. The third sipe portion (45*c*) has a depth (d14) smaller than those of the first sipe portion (45*a*) and the second sipe portion (45*b*), for example. The depth (d14) of the third sipe portion (45*c*) is in the range of from 0.40 to 0.60 times the depth (d12) of the first sipe portion (45*a*), for example. It is possible that the first center crown sipes 45 configured as such improve the steering stability and the uneven wear resistance performance in a good balance.

As shown in FIG. 3, a length L17 in the tyre axial direction of each of the second center crown sipes 46 is in the range of from 0.40 to 0.60 times a width w8 in the tyre axial direction of the center crown land region 8C, for example. Each of the second center crown sipes 46 in this embodiment terminates within the land region without crossing the tyre equator (C), for example.

It is preferred that each of the second center crown sipes 46 is curved so as to be convex toward either side in the tyre circumferential direction, for example. It is preferred that a radius of curvature of each of the second center crown sipes 46 is in the range of from 130 to 150 mm, for example.

Figure 7B:
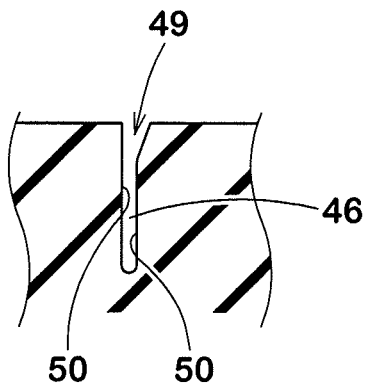
FIG. 7B is a cross-sectional view taken along L-L line of FIG. 3.

FIG. 7B is a cross-sectional view of one of the second center crown sipes 46 taken along L-L line orthogonal thereto of FIG. 3. As shown in FIG. 7B, it is preferred that each of the second center crown sipes 46 has an opening portion 49 having a width increasing outwardly in the tyre radial direction, for example. In this embodiment, one of sipe walls 50 on one side in the tyre circumferential direction of each of the second center crown sipes 46 is inclined, whereby the opening portion 49 is formed. The sipe walls 50 on both sides may be inclined in each of the second center crown sipes 46, for example. Further, the second center crown sipes 46 may be respectively provided at the groove bottoms of the narrow groove portions described above, for example.

As shown in FIG. 3, it is preferred that, in each of the second outer crown sipes 27 in this embodiment, the inclined sipe wall 31 is arranged on one side in the tyre circumferential direction (the lower side in FIG. 3) and in each of the second center crown sipes 46 in this embodiment, the inclined sipe wall 50 is arranged on the other side (the upper side in FIG. 3) in the tyre circumferential direction.

Figure 7C:
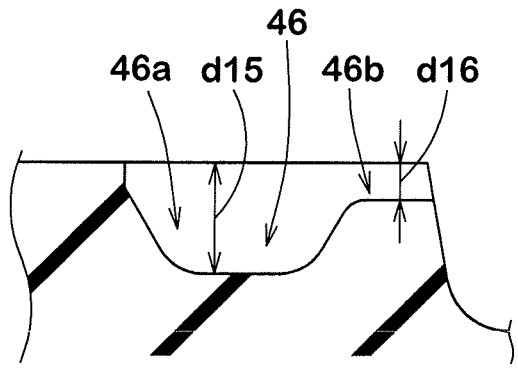
FIG. 7C is a cross-sectional view taken along M-M line of FIG. 3.

FIG. 7C is a cross-sectional view taken along M-M line along one of the second center crown sipes 46 of FIG. 3. As shown in FIG. 7C, it is preferred that each of the second center crown sipes 46 includes a first sipe portion (46*a*) arranged on a side of the terminating end thereof and a second sipe portion (46*b*) arranged on a side of the inner crown main groove 4B. The second sipe portion (46*b*) has a depth smaller than that of the first sipe portion (46*a*), for example. It is preferred that a depth (d16) of the second sipe portion (46*b*) is in the range of from 0.30 to 0.40 times a depth (d15) of the first sipe portion (46*a*), for example. Each of the second center crown sipes 46 configured as such suppresses a portion thereof on the side of the inner crown main groove 4B from being excessively opened, therefore, it is possible that the uneven wear resistance performance and the steering stability are improved.

Figure 8:
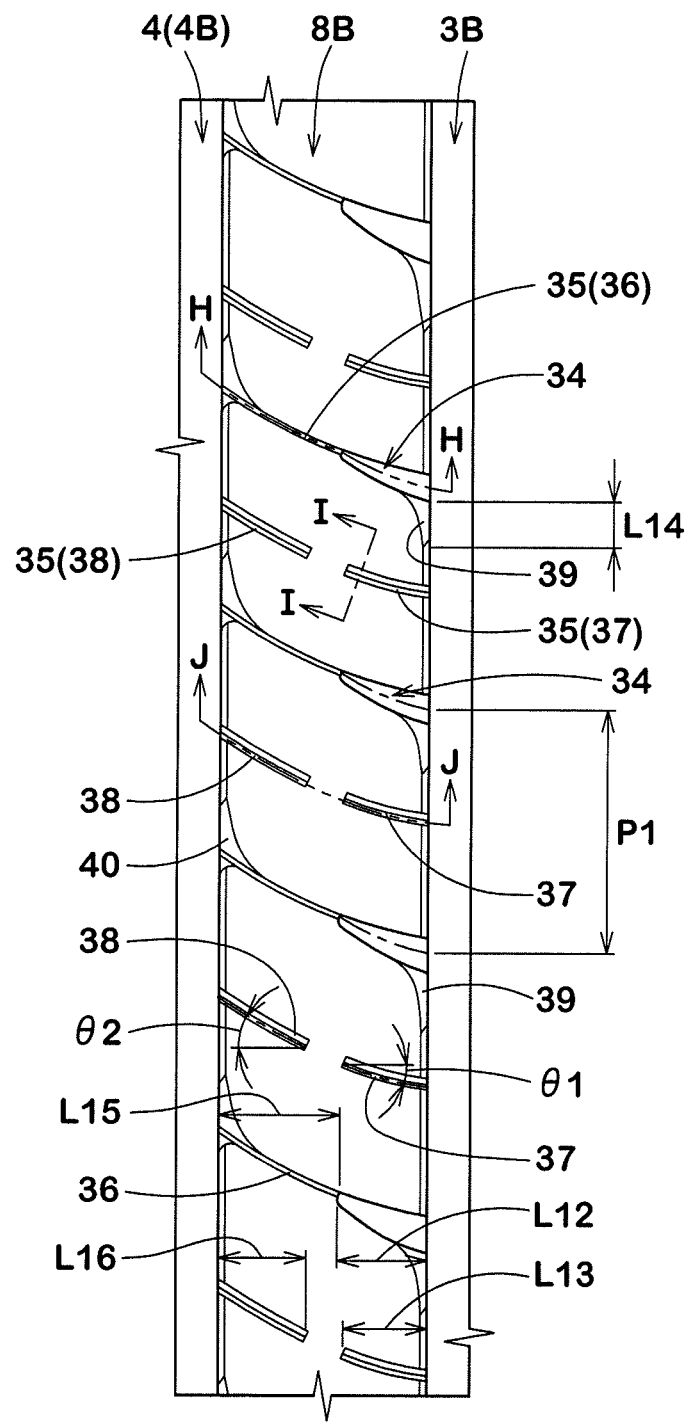
FIG. 8 is an enlarged view of an inner crown land region of FIG. 1.

FIG. 8 is an enlarged view of the inner crown land region 8B in this embodiment. As shown in FIG. 8, the inner crown land region 8B is provided with a plurality of crown lateral grooves 34 each having a width of not less than 1.5 mm and a plurality of inner crown sipes 35 each having a width of less than 1.5 mm.

Each of the crown lateral grooves 34 extends from the inner shoulder main groove 3B toward the crown main groove 4 and has an inner end terminating within the inner crown land region 8B. The crown lateral grooves 34 cooperate with the inner shoulder main grooves 3B to improve drainage performance in the vicinity of the inner crown land region 8B, for example.

The inner crown sipes 35 include first inner crown sipes 36, second inner crown sipes 37, and third inner crown sipes 38, for example. Each of the first inner crown sipes 36 extends between an inner end of a respective one of the crown lateral grooves 34 and the inner crown main groove 4B. Each of the second inner crown sipes 37 extends from the inner shoulder main groove 3B toward the crown main groove 4 and has an inner end terminating within the inner crown land region 8B. Each of the third inner crown sipes 38 extends from the inner crown main groove 4B toward the inner shoulder main groove 3B and has an outer end terminating within the inner crown land region 8B.

The crown lateral grooves 34 and the first inner crown sipes 36 moderate deformation of the inner crown land region 8B at the time of contacting the ground, therefore, the uneven wear thereof is suppressed. Further, the crown lateral grooves 34 each having the width of not less than 1.5 mm further moderate the rigidity of the inner crown land region 8B in a part thereof on the side of the inner shoulder main groove 3B, therefore, it is made easy for the inner crown land region 8B to follow the road surface, thereby, excellent initial responsiveness is exerted.

Further, the first inner crown sipes 36, the second inner crown sipes 37, and the third inner crown sipes 38 provide frictional force on a wet road surface by their respective edges. Furthermore, relatively large ground contact pressure is applied to the inner crown land region 8B, therefore, the wet performance is remarkably improved by the effect of these grooves and sipes.

Each of the first inner crown sipes 36, the second inner crown sipes 37, and the third inner crown sipes 38 has a width of less than 1.5 mm, therefore, almost no pumping noise is generated at the time of contacting the ground. Further, the first inner crown sipes 36, the second inner crown sipes 37, and the third inner crown sipes 38 moderately moderate the rigidity of the inner crown land region 8B, therefore, it is possible that impact sound when the land region contacts the ground is decreased. Thereby, it is possible that excellent noise performance is obtained.

It is preferred that each of the crown lateral grooves is configured to have a length L12 in the tyre axial direction larger than a length L13 in the tyre axial direction of each of the second inner crown sipes 37. Thereby, frequency bands of the impact sound when the edges of the crown lateral grooves 34 contact the ground and the impact sound when the edges of the second inner crown sipes 37 contact the ground are dispersed, therefore, the noise performance is improved eventually. Further, it is possible that the crown lateral grooves 34 having greater lengths than the sipes are expected to have high drainage performance.

In order to further increase the effects described above, the length L12 of each of the crown lateral grooves 34 is preferably not less than 105%, more preferably not less than 108%, and preferably not more than 120%, more preferably not more than 114% of the length L13 in the tyre axial direction of each of the second inner crown sipes 37.

The crown lateral grooves 34 are inclined with respect to the tyre axial direction, for example. It is preferred that a groove width of each of the crown lateral grooves 34 gradually decreases toward the inner crown main groove 4B, for example.

It is preferred that, in a connecting portion of each of the crown lateral grooves 34 with the inner shoulder main groove 3B, a portion between at least one of groove walls thereof and the tread ground contacting surface is chamfered so that the groove width thereof gradually increases toward the inner shoulder main groove 3B, for example. In this embodiment, a chamfered portion 39 is provided on one of the groove walls of each of the crown lateral grooves 34. In a preferred embodiment, the chamfered portion 39 of each of the crown lateral grooves 34 is provided on the same side in the tyre circumferential direction as the chamfered portion 28 (shown in FIG. 3) provided in the narrow sipe portion 22 of each of the first outer crown sipes 26. It is possible that the crown lateral grooves 34 configured as such suppress the generation of a stationary wave in the inner shoulder main groove 3B while improving the uneven wear resistance performance, therefore, it is possible that the air column resonance sound is eventually decreased.

It is preferred that a length L14 in the tyre circumferential direction of the chamfered portion 39 of each of the crown lateral grooves 34 is in the range of from 0.15 to 0.30 times one pitch length P1 of the crown lateral grooves 34, for example. Thereby, the wet performance and the noise performance are improved in a good balance.

The first inner crown sipes 36 are inclined in the same direction as the crown lateral grooves 34, for example. In this embodiment, one of edges of each of the first inner crown sipes 36 extends so as to be smoothly continuous with one of the edges on the same side of a respective one of the crown lateral grooves 34.

It is preferred that a length L15 in the tyre axial direction of each of the first inner crown sipes 36 is in the range of from 0.50 to 0.65 times a width w9 in the tyre axial direction of the inner crown land region 8B, for example.

It is preferred that each of the first inner crown sipes 36 is curved so as to be convex toward either side in the tyre circumferential direction, for example. Each of the first inner crown sipes 36 in this embodiment is curved so as to be convex toward the opposite side to each of the second center crown sipes 46 (shown in FIG. 3), for example. In other words, each of the first inner crown sipes 36 is curved so as to be convex toward one side in the tyre circumferential direction and each of the second center crown sipes 46 is curved so as to be convex toward the other side in the tyre circumferential direction. Thereby, each of the sipes exerts frictional force in multiple directions, therefore, excellent wet performance is obtained.

It is preferred that each of the first inner crown sipes 36 is curved with a radius of curvature smaller than that of each of the second center crown sipes 46, for example. It is preferred that the radius of curvature of each of the first inner crown sipes 36 is in the range of from 40 to 70 mm, for example.

Figure 9:
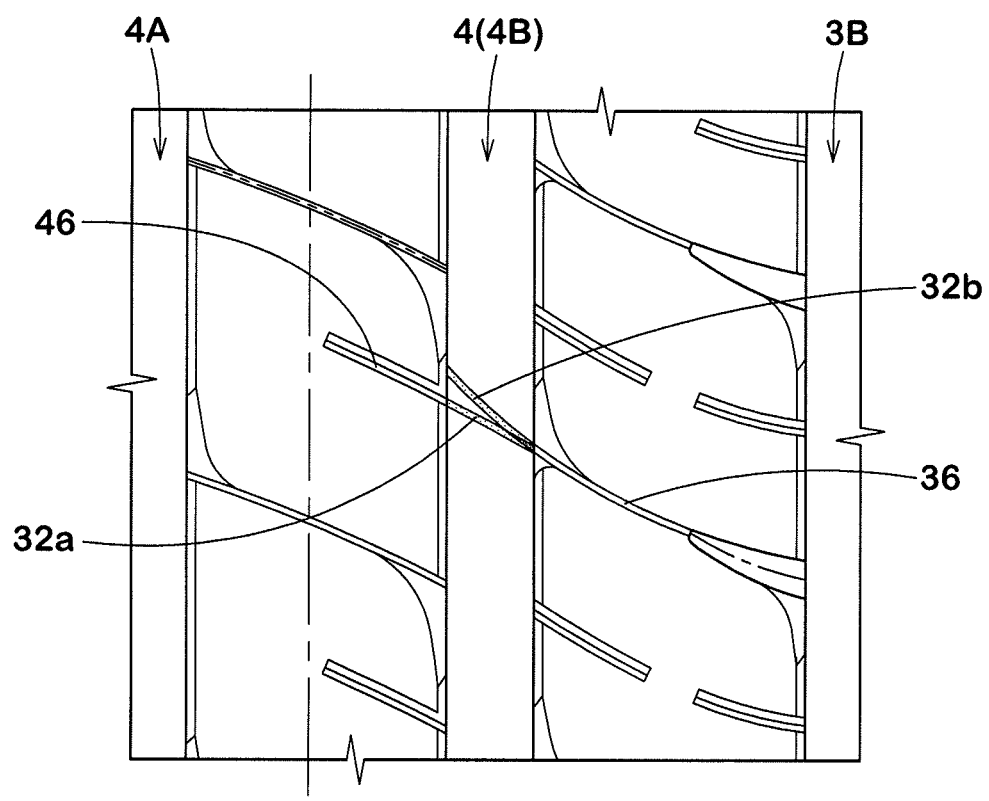
FIG. 9 is an enlarged view of first inner crown sipes and second center crown sipes of FIG. 1.

FIG. 9 is an enlarged view of the first inner crown sipes 36 and the second center crown sipes 46. As shown in FIG. 9, in this embodiment, each of the first inner crown sipes 36 is arranged at a position so as to be smoothly continuous with a respective one of the second center crown sipes 46 with the inner crown main groove 4B therebetween. Note that the sipe being "provided at a position so as to be smoothly continuous" with another sipe at least includes, as described above, an embodiment in which the minimum separation distance in the tyre circumferential direction between the first region (32a) obtained by virtually extending one of the sipes and the second region (32b) obtained by virtually extending the other one of the sipes is less than 1.0 mm. In this embodiment, at least a part of the first region (32a) and the second region (32b) intersect with each other (that is, the minimum separation distance=0). In a more preferred embodiment, the first region (32a) intersects with an end portion of the other one of the sipes and the second region (32b) intersects with an end portion of the one of the sipes.

In this embodiment, due to the arrangement of the sipes described above, it is made easy for the first inner crown sipes 36 and the second center crown sipes 46 to open, therefore, the rigidity is moderated in a part on the side of the inner crown main groove 4B of each of the inner crown land region 8B and the center crown land region 8C, thereby, it is possible that further excellent initial responsiveness is obtained.

As shown in FIG. 8, it is preferred that, in a connecting portion of each of the first inner crown sipes 36 with the crown main groove 4, a portion between at least one of sipe walls thereof and the tread ground contacting surface is chamfered so that the width thereof gradually increases toward the crown main groove 4. It is preferred that each of the first inner crown sipes 36 has a chamfered portion 40 on the opposite side in the tyre circumferential direction to the chamfered portion 39 of each of the crown lateral grooves 34, for example. Thereby, the frequency bands of the impact sound generated when the edge on one side of each of the first inner crown sipes 36 and the edge on one side of each of the crown lateral grooves 34 come into contact with the road surface and the impact sound generated when the edge on the other side of each of the first inner crown sipes 36 and the edge on the other side of each of the crown lateral grooves 34 come into contact with the road surface become more likely to be dispersed, therefore, the noise performance is improved.

Figure 10A:
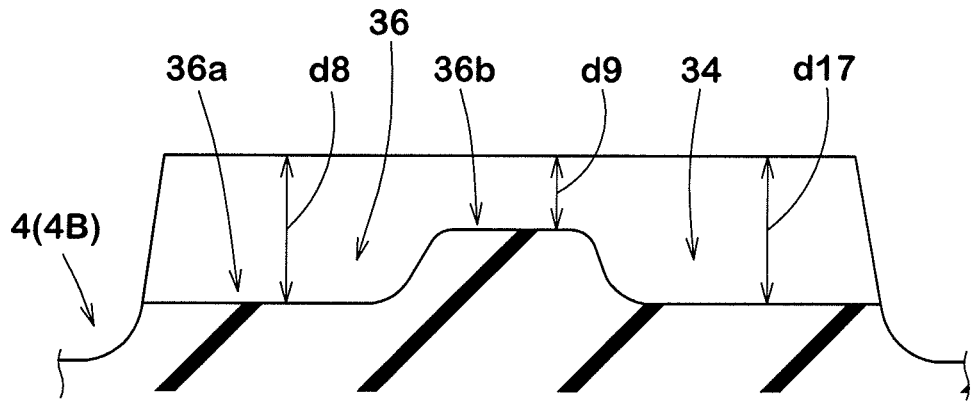
FIG. 10A is a cross-sectional view taken along H-H line of FIG. 8.

FIG. 10A is a cross-sectional view of one of the crown lateral grooves 34 and one of the first inner crown sipes 36 taken along H-H line of FIG. 8. As shown in FIG. 10A, it is preferred that each of the first inner crown sipes 36 includes a first sipe portion (36a) arranged on a side of the crown main groove 4 and a second sipe portion (36b) arranged on a side of a respective one of the crown lateral grooves 34.

The first sipe portion (36a) has a depth (d8) same as a depth (d17) of each of the crown lateral grooves 34, for example. It is preferred that the second sipe portion (36b) has a depth (d9) smaller than that of the first sipe portion (36a), for example. The depth (d9) of the second sipe portion (36b) is in the range of from 0.40 to 0.60 times the depth (d8) of the first sipe portion (36a), for example. The first inner crown sipes 36 configured as such make it easy for a part of the inner crown land region 8B on the side of the crown main groove 4 to deform moderately, therefore, it is possible that the generation of the stationary wave in the crown main groove 4 is suppressed, thereby, it is possible that the air column resonance sound of the crown main groove 4 is decreased.

As shown in FIG. 8, each of the second inner crown sipes 37 and the third inner crown sipes 38 terminates without crossing a center position in the tyre axial direction of the inner crown land region 8B. Each of the second inner crown sipes 37 and the third inner crown sipes 38 in this embodiment has a length in the tyre axial direction smaller than that of each of the first inner crown sipes 36, for example. It is preferred that the length L13 in the tyre axial direction of each of the second inner crown sipes 37 and a length L16 in the tyre axial direction of each of the third inner crown sipes 38 is in the range of from 0.60 to 0.75 times a length L15 in the tyre axial direction of each of the first inner sipes 36, respectively.

It is preferred that the second inner crown sipes 37 and the third inner crown sipes 38 are inclined in the same direction as the first inner crown sipes 36 with respect to the tyre axial direction, for example. It is preferred that an angle θ1 of each of the second inner crown sipes 37 with respect to the tyre axial direction is in the range of from 0 to 20 degrees, for example. It is preferred that an angle θ2 of each of the third inner crown sipes 38 with respect to the tyre axial direction is larger than the angle θ1 and in the range of from 20 to 40 degrees, for example. The second inner crown sipes 37 and the third inner crown sipes 38 configured as such are useful for making the impact sound generated when the edges of each of the sipes contact the road surface into white noise.

It is preferred that each of the second inner crown sipes 37 and the third inner crown sipes 38 is curved so as to be convex toward either side in the tyre circumferential direction, for example. In this embodiment, the first inner crown sipes 36, the second inner crown sipes 37, and the third inner crown sipes 38 are convex toward the same direction with respect to the tyre circumferential direction. It is preferred that the radius of curvature of each of the second inner crown sipes 37 and the third inner crown sipes 38 is in the range of from 30 to 50 mm, for example.

In a preferred embodiment, each of the third inner crown sipes 38 is curved so as to be convex toward the opposite direction to each of the first center crown sipes 45 (shown in FIG. 3), for example. In other words, each of the third inner crown sipes 38 is curved so as to be convex toward one side in the tyre circumferential direction and each of the first center crown sipes 45 is curved so as to be convex toward the other side in the tyre circumferential direction. Further, it is preferred that each of the third inner crown sipes 38 is curved with the radius of curvature smaller than that of each of the first center crown sipes 45.

In a more preferred embodiment, each of the third inner crown sipes 38 is arranged at a position so as to be smoothly continuous with a respective one of the first center crown sipes 45 with the inner crown main groove 4B therebetween. Thereby, it becomes easier for the land parts around the sipes to follow the road surface, therefore, the initial responsiveness is improved.

Figure 10B:
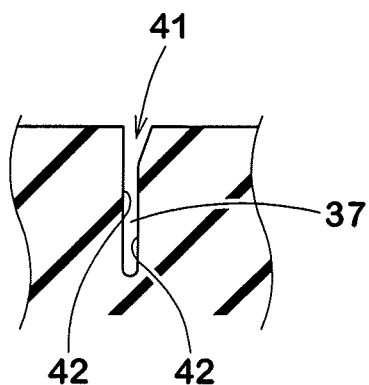
FIG. 10B is a cross-sectional view taken along I-I line of FIG. 8.

FIG. 10B is a cross-sectional view of one of the second inner crown sipes 37 taken along I-I line perpendicular thereto of FIG. 8. As shown in FIG. 10B, it is preferred that each of the second inner crown sipes 37 has an opening portion 41 having a width increasing outwardly in the tyre radial direction, for example. In this embodiment, one of sipe walls 42 on one side in the tyre circumferential direction of each of the second inner crown sipes 37 is inclined, whereby the opening portion 41 is formed. One of the sipe walls 42 on the same side in the tyre circumferential direction as the inclined sipe wall 50 (shown in FIG. 3) of the opening portion 49 of each of the second center crown sipes 46 is inclined, whereby the opening portion 41 in this embodiment is formed. The sipe walls 42 on both sides may be inclined in each of the second inner crown sipes 37, for example. Further, the second inner crown sipes 37 may be respectively provided at the groove bottoms of the narrow groove portions described above, for example. Each of the third inner crown sipes 38 has the same cross-sectional shape as each of the second inner crown sipes 37 described above, for example.

Figure 10C:
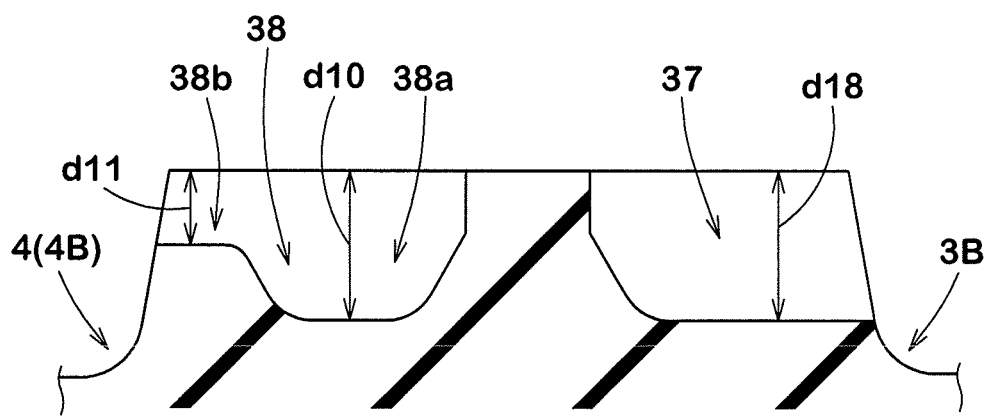
FIG. 10C is a cross-sectional view taken along J-J line of FIG. 8.

FIG. 10C is a cross-sectional view of one of the second inner crown sipes 37 and one of the third inner crown sipes 38 taken along J-J line of FIG. 8. As shown in FIG. 10C, each of the second inner crown sipes 37 extends at a constant depth until the depth gradually decreases near the inner end thereof. Each of the third inner crown sipes 38 includes a first sipe portion (38a) arranged on a side of a respective one of the second inner crown sipes 37 and a second sipe portion (38b) arranged on a side of the crown main groove 4. The first sipe portion (38a) has a depth (d10) same as a depth (d18) of each of the second inner crown sipes 37, for example. The second sipe portion (38b) has a depth (d11) smaller than that of the first sipe portion (38a), for example. It is preferred that the depth (d11) of the second sipe portion (38b) is in the range of from 0.45 to 0.55 times the depth (d10) of the first sipe portion (38a), for example. It is possible that the second inner crown sipes 37 and the third inner crown sipes 38 configured as such, in combination with the first inner crown sipes 36 described above, improve the wet performance and the noise performance in a good balance.

As shown in FIG. 1, in a more preferred embodiment, each of the third inner crown sipes 38 is arranged so as to be smoothly continuous with a respective one of the first center crown sipes 45 with the inner crown main groove 4B therebetween. Thereby, it becomes easier for the land parts around the sipes to follow the road surface, therefore, the initial responsiveness is improved.

As shown in FIG. 2, it is preferred that both of an inner edge (43a) arranged on the side of the inner crown main groove 4B and an outer edge (43b) arranged on the side of the inner shoulder main groove 3B of the inner crown land region 8B are chamfered. It is preferred that both of an inner edge (43a) arranged on the side of the outer crown main groove 4A and an outer edge (43b) arranged on the side of the outer shoulder main groove 3A of the outer crown land region 8A are chamfered. Similarly, it is preferred that each of edges (43c) of the center crown land region 8C is chamfered. It is possible that each of the land regions configured as such moderates the impact sound generated when the edges come into contact with the road surface.

It is preferred that, in each of the inner crown land region 8B and the outer crown land region 8A, a radius of curvature R1 of the tread ground contacting surface is not more than 560 mm. Specifically, it is preferred that the radius of curvature R1 is in the range of from 400 to 500 mm. Thereby, the ground contact pressure applied to the inner crown land region 8B and the outer crown land region 8A is increased while the ground contact pressure applied to the outer shoulder land region 7A and the inner shoulder land region 7B is moderated, therefore, it is possible that sound generated when each of the shoulder land regions 7A and 7B rotates.

Figure 11:
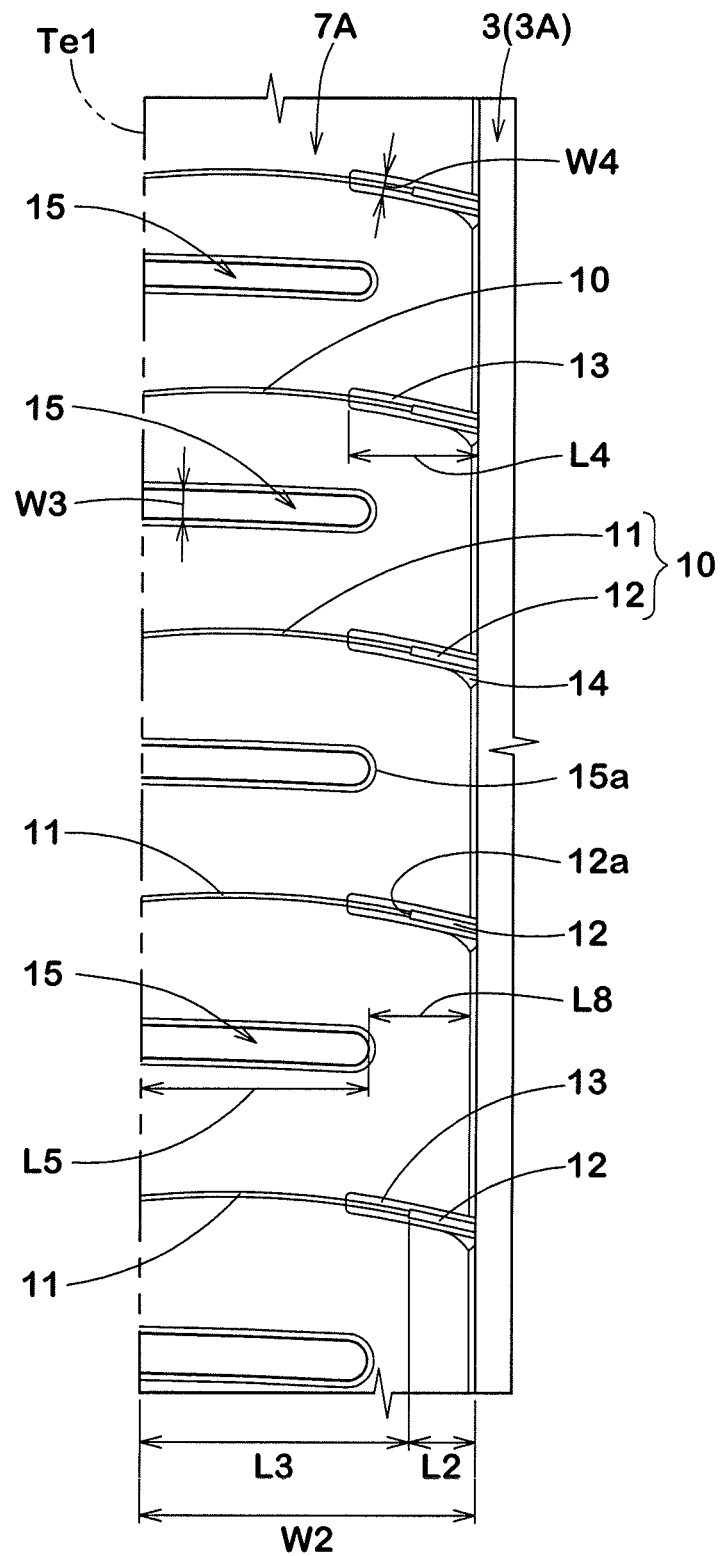
FIG. 11 is an enlarged view of an outer shoulder land region of FIG. 1.

FIG. 11 is an enlarged view of the outer shoulder land region 7A as an example of the shoulder land region 7. As shown in FIG. 11, the shoulder land region 7A is provided with shoulder sipes 10 extending in the tyre axial direction. Further, in this specification, the shoulder sipes provided in the outer shoulder land region 7A may be referred to as outer shoulder sipes. The shoulder sipes 10 moderate deformation of the shoulder land region 7A at the time of contacting the ground, therefore, the uneven wear thereof is suppressed.

Each of the shoulder sipes 10 in this embodiment extends between the outer shoulder main groove 3A and the first tread edge (Te1). However, it is not limited to such an embodiment, and each of the shoulder sipes 10 may have one end or both ends terminating within the shoulder land region 7A.

Each of the shoulder sipes 10 includes a narrow sipe portion 11 and a wide sipe portion 12 having a width larger than that of the narrow sipe portion 11. Note that the dimensions of the narrow sipe portion 22 and the wide sipe portion 23 of each of the first outer crown sipes 26 described above can be applied to the narrow sipe portion 11 and the wide sipe portion 12 of each of the shoulder sipes 10.

It is possible that the wide sipe portion 12 moderates the rigidity of the surrounding land part thereof more than the narrow sipe portion 11. Thereby, it is easy for the land part around the wide sipe portion 12 to follow the road surface even in an early stage of cornering in which the ground contacting load is not sufficiently increased, for example, therefore, it is possible that excellent initial responsiveness is obtained.

The wide sipe portion 12 of the present invention is arranged on a side of the outer shoulder main groove 3A. A larger ground contacting load tends to be applied to a part of the outer shoulder land region 7A on a side of the outer shoulder main groove 3A than a part thereof on a side of the first tread edge (Te1) at the early stage of cornering. Therefore, by providing the wide sipe portions 12 in this region, the initial responsiveness is remarkably improved.

Further, the land parts around the narrow sipe portions 11 are located closer to the first tread edge (Te1) than the wide sipe portions 12, therefore, they provide higher rigidity than the land parts around the wide sipe portions 12, thereby, in the middle stage of cornering in which sufficient ground contacting load is applied to the tyre, for example, large cornering force is exerted, therefore, it is possible that the steering stability is improved eventually.

It is preferred that each of the wide sipe portions 12 is connected with the outer shoulder main groove 3A, for example. It is preferred that a length L2 in the tyre axial direction of each of the wide sipe portions 12 is in the range of from 0.15 to 0.30 times a width w2 of the outer shoulder land region 7A, for example. It is possible that the wide sipe portions 12 configured as such improve uneven wear resistance performance and the steering stability in a good balance.

It is preferred that each of the narrow sipe portions 11 is connected with the first tread edge (Te1), for example. Further, it is preferred that a length L3 in the tyre axial direction of each of the narrow sipe portions 11 is larger than the length L2 in the tyre axial direction of each of the wide sipe portions 12. Specifically, it is preferred that the length L3 of each of the narrow sipe portions 11 is in the range of from 3.0 to 4.5 times the length L2 of each of the wide sipe portions 12, for example.

It is preferred that the outer shoulder land region 7A is provided with narrow groove portions 13 configured similarly to the narrow groove portions 24 (shown in FIG. 3) provided in the outer crown land region 8A, and that each of the wide sipe portions 12 extends inwardly in a tyre radial direction from a groove bottom of a respective one of the narrow groove portions 13. It is possible that the narrow groove portions 13 and the wide sipe portions 12 configured as such further improve the uneven wear resistance performance.

It is preferred that each of the narrow groove portions 13 extends outwardly in the tyre axial direction from the outer shoulder main groove 3A and terminates between an outer end in the tyre axial direction of a respective one of the wide sipe portions 12 and the first tread edge (Te1), for example. It is preferred that a length L4 in the tyre axial direction of each of the narrow groove portions 13 is in the range of from 1.5 to 2.5 times the length L2 in the tyre axial direction of each of the wide sipe portions 12, for example.

In each set of one of the shoulder sipes 10 and a respective one of the narrow groove portions 13, between the outer end of the wide sipe portion 12 and an outer end of the narrow groove portion 13, it is preferred that the narrow sipe portion 11 extends inwardly in the tyre radial direction from a groove bottom of the narrow groove portion 13. Further, in a region between the outer end of the narrow groove portion 13 and the first tread edge (Te1), it is preferred that the narrow sipe portion 11 extends with a constant width between a bottom thereof and the ground contacting surface.

It is preferred that in a connecting portion of each of the narrow groove portions 13 with the outer shoulder main groove 3A, a portion between at least one of groove walls thereof and the tread ground contacting surface is chamfered so that a groove width thereof gradually increases toward the outer shoulder main groove 3A. In each of the narrow groove portions 13 in this embodiment, only one of the groove walls (the lower groove wall in FIG. 11) has a chamfered portion 14, for example. It is possible that the narrow groove portions 13 configured as such decrease the air column resonance sound in the outer shoulder main groove 3A while improving the uneven wear resistance performance.

In this embodiment, as shown in FIG. 1, each of the narrow groove portions 13 provided in the outer shoulder land region 7A has the chamfered portion 14 in the groove wall on one side (the lower side in FIG. 1) in the tyre circumferential direction, and each of the narrow groove portions 24 provided in the outer crown land region 8A has the chamfered portion 25 in the groove wall thereof on the other side (the upper side in FIG. 1) in the tyre circumferential direction. Each of the chamfered portions 25 provided in the outer crown land region 8A has a larger chamfer length in the tyre circumferential direction than that of each of the chamfered portions 14 provided in the outer shoulder land region 7A. It is possible that such an arrangement of the narrow groove portions 24 improves the uneven wear resistance performance and suppresses generation of a stationary wave in the outer shoulder main groove 3A, therefore, it is possible that the air column resonance sound is eventually decreased.

Further, in each pair of one of the first outer crown sipes 26 and one of the outer shoulder sipes 10 adjacent to each other in the tyre axial direction, it is preferred that a displacement amount in the tyre circumferential direction between the first outer crown sipe 26 and the outer shoulder sipe 10 at the outer shoulder main groove 3A is not more than 1.0 mm. Each of the outer shoulder sipes 10 in this embodiment is arranged so as to be continuous with a respective one of the first outer crown sipes 26 with the outer shoulder main groove 3A therebetween, and in a preferred embodiment, each of the outer shoulder sipes 10 includes a portion linearly continuous with a respective one of the first outer crown sipes 26 with the outer shoulder main groove 3A therebetween. Such an arrangement of the sipes makes it further easier for the surrounding land parts to follow the road surface, therefore, it is possible that the initial responsiveness is further improved.

As shown in FIG. 11, the outer shoulder land region 7A in this embodiment is provided with a plurality of the outer shoulder sipes 10 arranged at intervals in the tyre circumferential direction, and a shoulder lateral groove 15 is arranged between each pair of the shoulder sipes 10 adjacent to each other in the tyre circumferential direction. In this specification, the shoulder lateral grooves 15 provided in the outer shoulder land region 7A may be referred to as outer shoulder lateral grooves.

Each of the shoulder lateral grooves 15 extends inwardly in the tyre axial direction from the first tread edge (Te1) and terminates without being connected with the outer shoulder main groove 3A, for example. It is possible that the shoulder lateral grooves 15 configured as such improve the wet performance while maintaining the rigidity of the outer shoulder land region 7A.

It is preferred that inner ends (15a) in the tyre axial direction of the shoulder lateral grooves 15 are located on an outer side in the tyre axial direction of outer ends (12a) in the tyre axial direction of the wide sipe portions 12. It is preferred that a length L5 in the tyre axial direction of each of the shoulder lateral grooves 15 is in the range of from 0.60 to 0.75 times the width w2 in the tyre axial direction of the outer shoulder land region 7A, for example.

In order to exert sufficient drainage performance, it is preferred that a groove width w3 of each of the shoulder lateral grooves 15 is in the range of from 1.5 to 2.5 times a groove width w4 of each of the narrow groove portions 13, for example.

Figure 12:
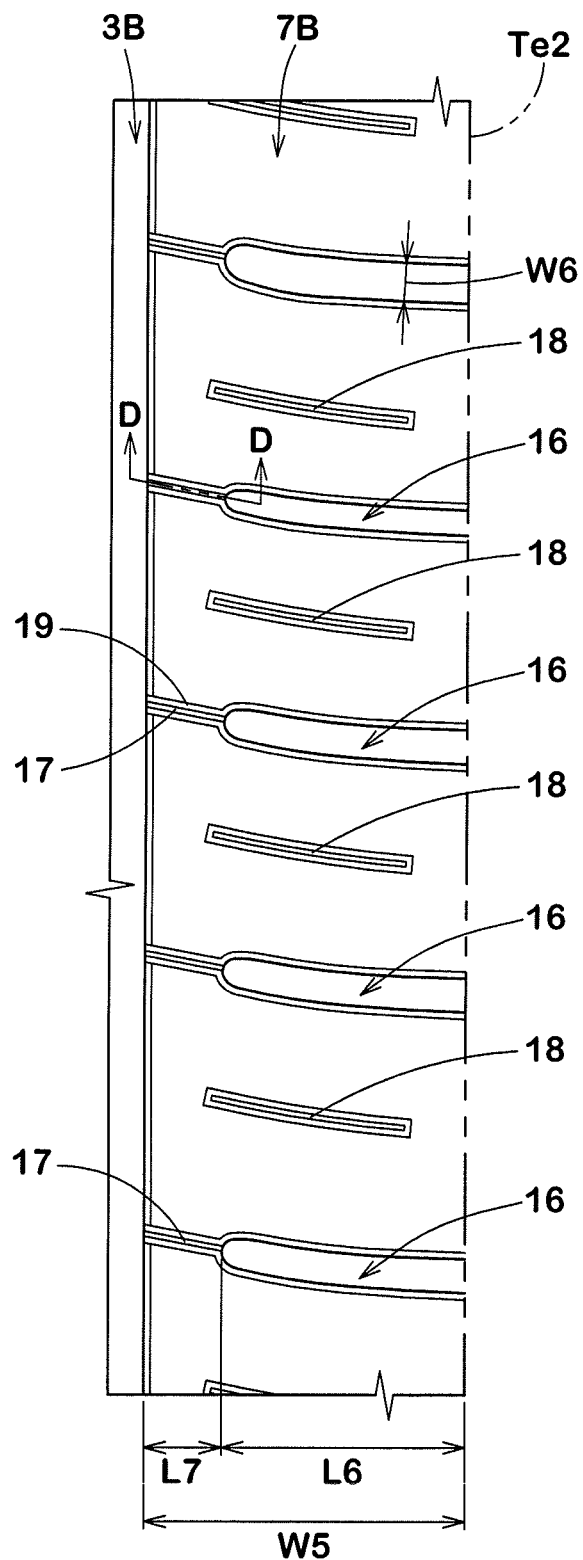
FIG. 12 is an enlarged view of an inner shoulder land region of FIG. 1.

FIG. 12 is an enlarged view of the inner shoulder land region 7B as another example of the shoulder land region 7. As shown in FIG. 12, the inner shoulder land region 7B is provided with a plurality of inner shoulder lateral grooves 16, for example. Each of the inner shoulder lateral grooves 16 extends inwardly in the tyre axial direction from the second tread edge (Te2) and terminates without being connected with the inner shoulder main groove 3B, for example.

It is preferred that a length L6 in the tyre axial direction of each of the inner shoulder lateral grooves 16 is in the range of from 0.70 to 0.80 times a width w5 in the tyre axial direction of the inner shoulder land region 7B, for example. It is possible that the inner shoulder lateral grooves 16 configured as such improve the steering stability and the wet performance in a good balance.

It is preferred that a distance L7 in the tyre axial direction between an inner end of each of the inner shoulder lateral grooves 16 and the inner shoulder main groove 3B is smaller than a distance L8 (shown in FIG. 11) between an inner end of each of the outer shoulder lateral grooves 15 and the outer shoulder main groove 3A, for example.

Each of the inner shoulder lateral grooves 16 has a groove width w6 larger than 2 mm, for example. It is preferred that the groove width w6 of each of the inner shoulder lateral grooves 16 is in the range of from 0.40 to 0.60 times the groove width (W1d) (shown in FIG. 1) of the inner shoulder main groove 3B, for example.

It is preferred that each of the inner shoulder lateral grooves 16 is curved so as to be convex toward either side in the tyre circumferential direction, for example. The inner shoulder lateral grooves 16 in this embodiment are convex toward the same direction as the first inner crown sipes 36. It is preferred that a radius of curvature of each of the inner shoulder lateral grooves 16 is larger than the radius of curvature of each of the first inner crown sipes 36, for example. It is preferred that the radius of curvature of each of the inner shoulder lateral grooves 16 is in the range of from 80 to 100 mm, for example. It is possible that the inner shoulder lateral grooves 16 configured as such smoothly guide water in the grooves toward the second tread edge (Te2) during running on a wet road surface.

The inner shoulder land region 7B is provided with connecting sipes 17 each extending so as to connect between a respective one of the inner shoulder lateral grooves 16 and the inner shoulder main groove 3B and inner shoulder sipes 18 each arranged between a respective pair of the inner shoulder lateral grooves 16 adjacent to each other in the tyre circumferential direction.

Each of the connecting sipes 17 extends inwardly in the tyre radial direction from a groove bottom of a respective one of narrow groove portions 19 each having a groove width of not less than 1.5 mm and a groove depth of not more than 2.0 mm, for example. Each of the connecting sipes 17 has a width in the range of from 0.4 to 0.8 mm, for example. It is possible that dimensions of the narrow groove portions 13 provided in the outer shoulder land region 7A are applied to dimensions of the narrow groove portions 19, for example.

As shown in FIG. 1, it is preferred that each of the connecting sipes 17 is smoothly continuous with a respective one of the crown lateral grooves 34 with the inner shoulder main groove 3B therebetween. Thereby, it is possible that the crown lateral grooves 34 cooperate with the inner shoulder lateral grooves 16 to improve the wet performance.

Figure 13:
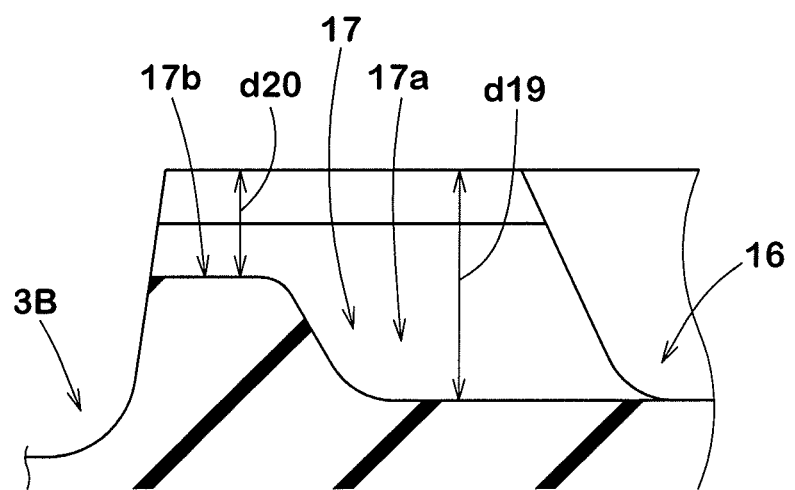
FIG. 13 is a cross-sectional view taken along D-D line of FIG. 12.

FIG. 13 is a cross-sectional view of one of the connecting sipes 17 taken along D-D line of FIG. 12. As shown in FIG. 13, each of the connecting sipes 17 includes a first sipe portion (17a) arranged on a side of a respective one of the inner shoulder lateral grooves 16 and a second sipe portion (17b) arranged on a side of the inner shoulder main groove 3B, for example. The second sipe portion (17b) has a depth smaller than that of the first sipe portion (17a), for example. It is preferred that a depth (d20) of the second sipe portion (17b) is in the range of from 0.35 to 0.55 times a depth (d19) of the first sipe portion (17a). Each of the connecting sipes 17 configured as such suppresses a portion thereof on the side of the inner shoulder main groove 3B from being excessively opened while improving the initial responsiveness, therefore, it is possible that the uneven wear resistance performance is improved as well.

As shown in FIG. 12, the inner shoulder sipes 18 extend along the inner shoulder lateral grooves 16, for example. Both ends of each of the inner shoulder sipes 18 terminate within the inner shoulder land region 7B, for example. The inner shoulder sipes 18 configured as such make it easier for the land region to follow the road surface while suppressing excessive decrease in the rigidity of the land region, therefore, it is possible that excellent steering stability and initial responsiveness are eventually exerted.

Similar to the connecting sipes 17 described above, each of the inner shoulder sipes 18 extends inwardly in the tyre radial direction from a groove bottom of a respective one of the narrow groove portions, for example.

As shown in FIG. 1, it is preferred that a land ratio (Lr1) of the region between the tyre equator (C) and the first tread edge (Te1) is larger than a land ratio (Lr2) of the region between the tyre equator (C) and the second tread edge (Te2). Specifically, it is preferred that the land ratio (Lr1) is in the range of from 1.05 to 1.10 times the land ratio (Lr2). Thereby, the response during steering is made linear, therefore, it is possible that excellent steering stability is exerted. In this specification, the term "land ratio" means a ratio Sb/Sa of a total area Sa of an imaginary ground contacting surface obtained by filling all the grooves and the sipes and the actual total ground contacting area Sb.

While detailed description has been made of embodiments of the present invention, the present invention can be embodied in various forms without being limited to the illustrated embodiments.

WORKING EXAMPLES (EXAMPLES)

Figure 14:
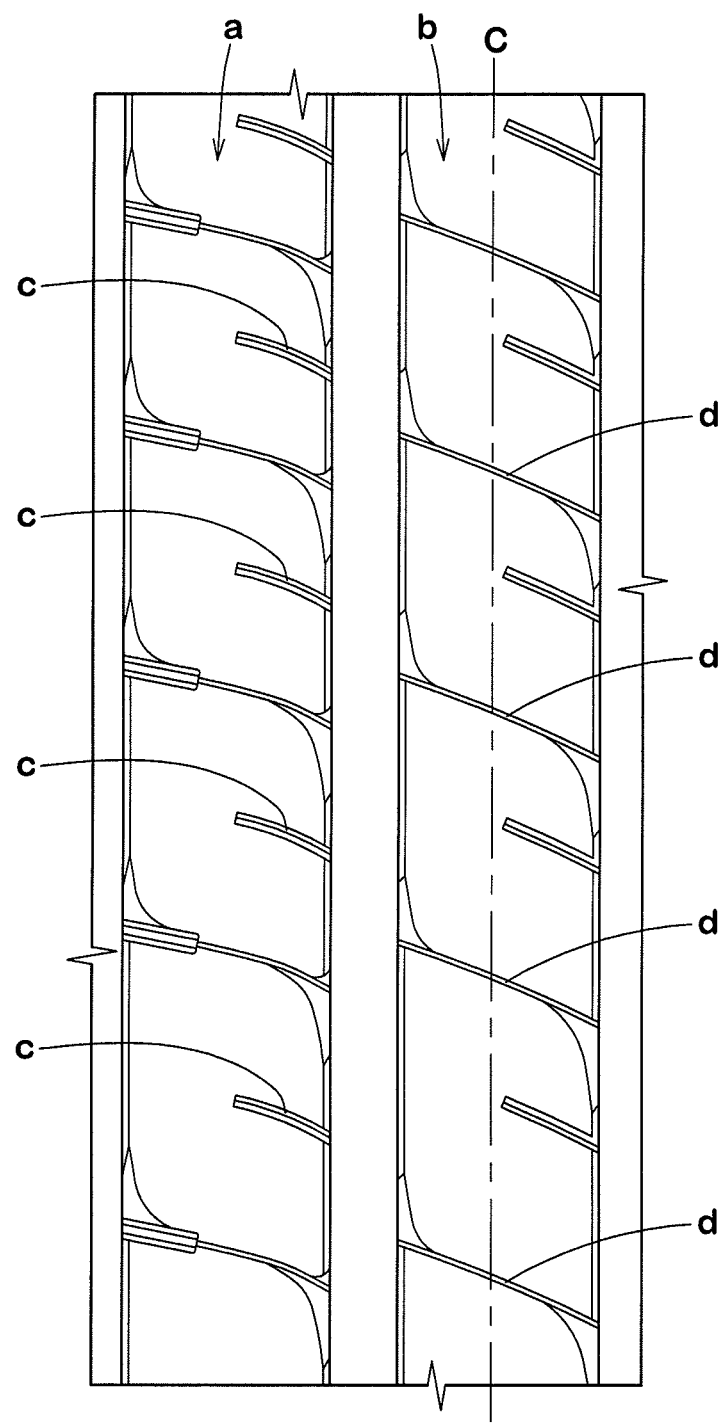
FIG. 14 is an enlarged view of the outer crown land region and the center crown land region of comparative example.

Tires of size 215/60R16 having the basic pattern shown in FIG. 1 were made by way of test according to the specifications listed in Table 1. As Comparative Example, tyres as shown in FIG. 14 were made by way of test. In each of the test tyres as the Comparative Example, in a pair of one of second outer crown sipes (c) provided in an outer crown land region (a) and one of first inner crown sipes (d) provided in a center crown land region (b) adjacent to each other in the tyre circumferential direction, the second outer crown sipe (c) and the third inner crown sipe (d) are misaligned and not smoothly continuous with each other. The tyres as the Comparative Example had substantially the same tread portion as that shown in FIG. 1 except for the configurations described above. Each of the test tyres was tested for the steering stability and the uneven wear resistance performance of the crown land regions. Common specifications of the test tyres and the test methods are as follows.

Tire rim: 16×6.5J
Tire inner pressure: 250 kPa at front wheels, 230 kPa at rear wheels
Test car: 4WD-car with displacement of 1500 cc
Tire mounting position: all wheels
The test methods were as follows.
<Steering Stability>

While the test car described above was driven on a dry road surface, the steering stability including the initial responsiveness was evaluated by the driver's feeling. The test results are indicated as an evaluation point based on the Comparative Example being 100 wherein the larger the numerical value, the better the steering stability is.
<Uneven Wear Resistance Performance>

Wear energy of the outer crown land region and the center crown land region was measured by using a wear energy measuring device. The test results are indicated by an index based on the wear energy of the Comparative Example being 100, wherein the smaller the numerical value, the smaller the wear energy is, which shows more excellent uneven wear resistance performance.

The test results are shown in Table 1.

From the test results, it was confirmed that the tyres as Examples 1 to 5 had excellent steering stability and that the uneven wear resistance performance of the crown land regions was improved.

Figure 15:
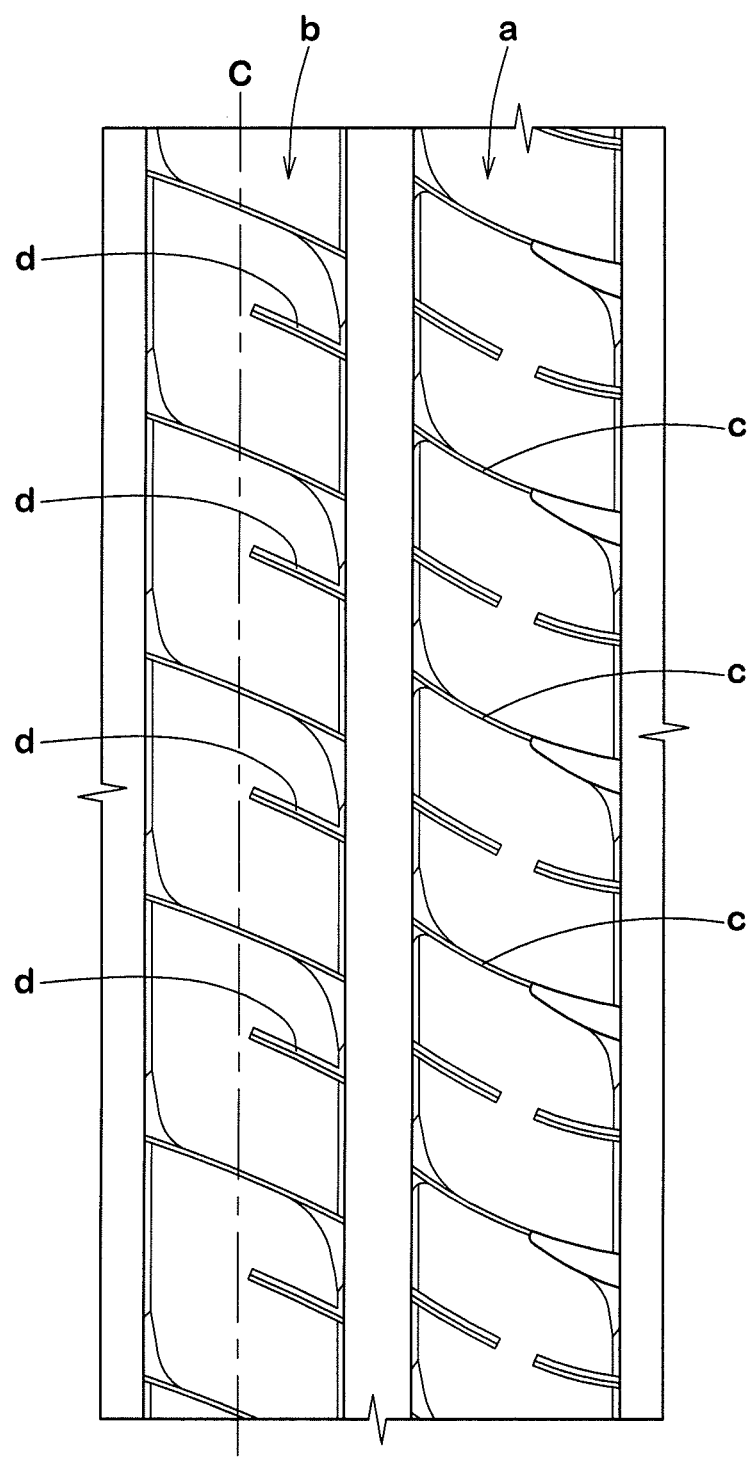
FIG. 15 is an enlarged view of the inner crown land region and the center crown land region of Reference.

Tires of size 215/60R16 having the basic pattern shown in FIG. 1 were made by way of test according to the specifications listed in Table 2. As Reference, tyres as shown in FIG. 15 were made by way of test. In each of the test tyres as the Reference, in a pair of one of first inner crown sipes (c) provided in an inner crown land region (a) and one of second center crown sipes (d) provided in the center crown land region (b) adjacent to each other in the tyre circumferential direction, the first inner crown sipe (c) and the second center crown sipe (d) are misaligned and not smoothly continuous with each other. The tyres as the Reference had substantially the same tread portion as that shown in FIG. 1 except for the configurations described above. Each of the test tyres was tested for the steering stability and the uneven wear resistance performance of the crown land regions. Common specifications of the test tyres and the test methods were as follows.

Tire rim: 16×6.0J
Tire inner pressure: 240 kPa
Test car: 4WD-car with displacement of 2000 cc
Tire mounting position: all wheels
The test methods were as follows.

<Steering Stability>

While the test car described above was driven on a dry road surface, the steering stability including the initial responsiveness was evaluated by the driver's feeling. The test results are indicated as an evaluation point based on the Reference being 100 wherein the larger the numerical value, the better the steering stability is.

<Uneven Wear Resistance Performance>

The wear energy of the inner crown land region and the center crown land region was measured by using the wear energy measuring device. The test results are indicated by an index based on the wear energy of the Reference being 100, wherein the smaller the numerical value, the smaller the

TABLE 1

|  | Comp. | Ex. 1 | Ex. 2 | Ex. 3 | Ex. 4 | Ex. 5 |
| --- | --- | --- | --- | --- | --- | --- |
| Figure showing Crown land region | FIG. 14 | FIG. 3 | FIG. 3 | FIG. 3 | FIG. 3 | FIG. 3 |
| Length L11 of Second outer crown sipe/ Width W7 of Outer crown land region | 0.45 | 0.45 | 0.35 | 0.42 | 0.48 | 0.55 |
| Steering stability [evaluation point] | 100 | 105 | 103 | 104 | 105 | 105 |
| Uneven wear resistance performance [index] | 100 | 95 | 94 | 95 | 95 | 97 | wear energy is, which shows more excellent uneven wear resistance performance.

The test results are shown in Table 2.

TABLE 2

|  | Ref. | Ex. 6 | Ex. 7 | Ex. 8 | Ex. 9 | Ex. 10 | Ex. 11 | Ex. 12 | Ex. 13 | Ex. 14 |
| --- | --- | --- | --- | --- | --- | --- | --- | --- | --- | --- |
| Figure showing Crown land region | FIG. 15 | FIG. 1 | FIG. 1 | FIG. 1 | FIG. 1 | FIG. 1 | FIG. 1 | FIG. 1 | FIG. 1 | FIG. 1 |
| Length L15 of First inner crown sipe/Width W9 of Inner crown land region | 0.58 | 0.58 | 0.50 | 0.55 | 0.60 | 0.65 | 0.58 | 0.58 | 0.58 | 0.58 |
| Length L17 of Second center crown sipe/Width W8 of Center crown land region | 0.48 | 0.48 | 0.48 | 0.48 | 0.48 | 0.48 | 0.40 | 0.45 | 0.55 | 0.60 |
| Steering stability [evaluation point] | 100 | 105 | 103 | 105 | 105 | 104 | 105 | 105 | 104 | 104 |
| Uneven wear resistance performance [index] | 100 | 97 | 99 | 98 | 97 | 97 | 98 | 97 | 97 | 96 |

From the test results, it was confirmed that the tyres as Examples 6 to 14 had excellent steering stability and that the uneven wear resistance performance of the crown land regions was improved.

What is claimed is:

1. A tyre comprising a tread portion whose position when mounted on a vehicle is specified and having an asymmetric pattern with respect to a tyre equator, wherein the tread portion comprises an outer shoulder main groove extending continuously in a tyre circumferential direction, an outer crown main groove extending adjacently to the outer shoulder main groove and continuously in the tyre circumferential direction, an inner crown main groove extending adjacently to the outer crown main groove and continuously in the tyre circumferential direction, an outer crown land region defined between the outer shoulder main groove and the outer crown main groove, and a center crown land region defined between the outer crown main groove and the inner crown main groove, the outer crown land region is provided with first outer crown sipes each completely crossing the outer crown land region and second outer crown sipes each extending from the outer crown main groove toward the outer shoulder main groove and terminating within the outer crown land region, the center crown land region is provided with first center crown sipes each completely crossing the center crown land region, and second center crown sipes each extending from the inner crown main groove toward the outer crown main groove and terminating within the center crown land region, each of the second outer crown sipes is arranged so as to be smoothly continuous with a respective one of the first center crown sipes with the outer crown main groove therebetween, the center crown land region is arranged on the tyre equator, each of the second center crown sipes terminates within the center crown land region without crossing the tyre equator, each of the first outer crown sipes, the second outer crown sipes, the first center crown sipes, and the second center crown sipes has a width of less than 1.5 mm, the first center crown sipes and the second center crown sipes are arranged alternately one by one in the tyre circumferential direction in the center crown land region, and no sipes and grooves other than one second center crown sipe are provided between a pair of the first center crown sipes adjacent to each other in the tyre circumferential direction.

2. The tyre according to claim 1, wherein the tread portion further comprises an inner shoulder main groove extending adjacently to the inner crown main groove and continuously in the tyre circumferential direction, and an inner crown land region defined between the inner shoulder main groove and the inner crown main groove, the inner crown land region is provided with a plurality of crown lateral grooves each extending from the inner shoulder main groove toward the inner crown main groove with a width of not less than 1.5 mm and having an inner end terminating within the inner crown land region and first inner crown sipes each extending between the inner end of a respective one of the crown lateral grooves and the inner crown main groove with a width of less than 1.5 mm, and each of the first inner crown sipes is arranged so as to be smoothly continuous with a respective one of the second center crown sipes with the inner crown main groove therebetween.

3. The tyre according to claim 2, wherein the inner crown land region is provided with a plurality of second inner crown sipes each extending from the inner shoulder main groove toward the inner crown main groove with a width of less than 1.5 mm and having an inner end terminating within the inner crown land region.

4. The tyre according to claim 3, wherein a length in a tyre axial direction of each of the crown lateral grooves is larger than a length in the tyre axial direction of each of the second inner crown sipes.

5. The tyre according to claim 2, wherein the inner crown land region is provided with a plurality of third inner crown sipes each extending from the inner crown main groove toward the inner shoulder main groove with a width of less than 1.5 mm and having an outer end terminating within the inner crown land region.

6. The tyre according to claim 5, wherein each of the third inner crown sipes is arranged so as to be smoothly continuous with a respective one of the first center crown sipes with the inner crown main groove therebetween.

7. The tyre according to claim 5, wherein
- each of the third inner crown sipes is curved so as to be convex toward one side in the tyre circumferential direction, and
- each of the first center crown sipes is curved so as to be convex toward the other side in the tyre circumferential direction.

8. The tyre according to claim 7, wherein
- each of the third inner crown sipes is curved with a radius of curvature smaller than that of each of the first center crown sipes.

9. The tyre according to claim 2, wherein
- each of the first inner crown sipes is curved so as to be convex toward one side in the tyre circumferential direction, and
- each of the second center crown sipes is curved so as to be convex toward the other side in the tyre circumferential direction.

10. The tyre according to claim 9, wherein
- each of the first inner crown sipes is curved with a radius of curvature smaller than that of each of the second center crown sipes.

11. The tyre according to claim 1, wherein
- in a connecting portion of each of the first outer crown sipes with the outer crown main groove, a portion between at least one of sipe walls thereof and a tread ground contacting surface is chamfered so that a width thereof gradually increases toward the outer crown main groove.

12. The tyre according to claim 11, wherein
- in a connecting portion of each of the first center crown sipes with the outer crown main groove, a portion between at least one of sipe walls thereof and the tread ground contacting surface is chamfered so that a width thereof gradually increases toward the outer crown main groove.

13. The tyre according to claim 12, wherein
- in a connecting portion of each of the first center crown sipes with the inner crown main groove, a portion between at least one of sipe walls thereof and the tread ground contacting surface is chamfered so that a width thereof gradually increases toward the inner crown main groove.

14. The tyre according to claim 1, wherein
- each of the first outer crown sipes includes a narrow sipe portion and a wide sipe portion having a width larger than that of the narrow sipe portion.

15. The tyre according to claim 14, wherein
- the wide sipe portion is connected with the outer shoulder main groove.

16. The tyre according to claim 15, wherein
- a length in the tyre axial direction of the narrow sipe portion is larger than a length in the tyre axial direction of the wide sipe portion.

17. The tyre according to claim 1, wherein
- each of the second outer crown sipes includes a first sipe portion and a second sipe portion having a depth smaller than that of the first sipe portion.

18. The tyre according to claim 1, wherein
- a width of the inner shoulder main groove is less than or equal to 1.28 times a width of the outer shoulder main groove.

19. A tyre comprising a tread portion whose position when mounted on a vehicle is specified and having an asymmetric pattern with respect to a tyre equator, wherein
- the tread portion comprises an outer shoulder main groove extending continuously in a tyre circumferential direction, an outer crown main groove extending adjacently to the outer shoulder main groove and continuously in the tyre circumferential direction, an inner crown main groove extending adjacently to the outer crown main groove and continuously in the tyre circumferential direction, an outer crown land region defined between the outer shoulder main groove and the outer crown main groove, and a center crown land region defined between the outer crown main groove and the inner crown main groove,
- the outer crown land region is provided with first outer crown sipes each completely crossing the outer crown land region and second outer crown sipes each extending from the outer crown main groove toward the outer shoulder main groove and terminating within the outer crown land region,
- the center crown land region is provided with first center crown sipes each completely crossing the center crown land region, and second center crown sipes each extending from the inner crown main groove toward the outer crown main groove and terminating within the center crown land region,
- each of the second outer crown sipes is arranged so as to be smoothly continuous with a respective one of the first center crown sipes with the outer crown main groove therebetween,
- wherein the tread portion further comprises an inner shoulder main groove extending adjacently to the inner crown main groove and continuously in the tyre circumferential direction, and an inner crown land region defined between the inner shoulder main groove and the inner crown main groove,
- the inner crown land region is provided with a plurality of crown lateral grooves each extending from the inner shoulder main groove toward the inner crown main groove with a width of not less than 1.5 mm and having an inner end terminating within the inner crown land region and first inner crown sipes each extending between the inner end of a respective one of the crown lateral grooves and the inner crown main groove with a width of less than 1.5 mm,
- each of the first inner crown sipes is arranged so as to be smoothly continuous with a respective one of the second center crown sipes with the inner crown main groove therebetween,
- wherein the inner crown land region is provided with a plurality of third inner crown sipes each extending from the inner crown main groove toward the inner shoulder main groove with a width of less than 1.5 mm and having an outer end terminating within the inner crown land region,
- wherein each of the third inner crown sipes is arranged so as to be smoothly continuous with a respective one of the first center crown sipes with the inner crown main groove therebetween,
- wherein each of the sipes has a width of less than 1.5 mm,
- each of the second outer crown sipes and the third inner crown sipes has a terminating end without being connected with any other sipes and grooves,
- the first outer crown sipes and the second outer crown sipes are arranged alternately one by one in the tyre circumferential direction in the outer crown land region,
- the first center crown sipes and the second center crown sipes are arranged alternately one by one in the tyre circumferential direction in the center crown land region, and the crown lateral grooves and the third inner crown sipes are arranged alternately one by one in the tyre circumferential direction in the inner crown land region.

20. A tyre comprising a tread portion whose position when mounted on a vehicle is specified and having an asymmetric pattern with respect to a tyre equator, wherein the tread portion comprises an outer shoulder main groove extending continuously in a tyre circumferential direction, an outer crown main groove extending adjacently to the outer shoulder main groove and continuously in the tyre circumferential direction, an inner crown main groove extending adjacently to the outer crown main groove and continuously in the tyre circumferential direction, an outer crown land region defined between the outer shoulder main groove and the outer crown main groove, and a center crown land region defined between the outer crown main groove and the inner crown main groove, the outer crown land region is provided with first outer crown sipes each completely crossing the outer crown land region and second outer crown sipes each extending from the outer crown main groove toward the outer shoulder main groove and terminating within the outer crown land region, the center crown land region is provided with first center crown sipes each completely crossing the center crown land region, and second center crown sipes each extending from the inner crown main groove toward the outer crown main groove and terminating within the center crown land region, each of the second outer crown sipes is arranged so as to be smoothly continuous with a respective one of the first center crown sipes with the outer crown main groove therebetween, wherein the tread portion further comprises an inner shoulder main groove extending adjacently to the inner crown main groove and continuously in the tyre circumferential direction, and an inner crown land region defined between the inner shoulder main groove and the inner crown main groove, the inner crown land region is provided with a plurality of crown lateral grooves each extending from the inner shoulder main groove toward the inner crown main groove with a width of not less than 1.5 mm and having an inner end terminating within the inner crown land region and first inner crown sipes each extending between the inner end of a respective one of the crown lateral grooves and the inner crown main groove with a width of less than 1.5 mm, each of the first inner crown sipes is arranged so as to be smoothly continuous with a respective one of the second center crown sipes with the inner crown main groove therebetween, wherein the tread portion further comprises an inner shoulder land region arranged on a side of the inner shoulder main groove opposite to the inner crown land region, the inner shoulder land region is provided with connecting sipes each extending so as to connect between a respective one of inner shoulder lateral grooves and the inner shoulder main groove, and to be smoothly continuous with a respective one of the crown lateral grooves with the inner shoulder main groove therebetween, each of the second center crown sipes has a terminating end without being connected with other sipes and grooves, and the inner shoulder land region has no grooves and sipes connected with the inner shoulder main groove other than the connecting sipes.

* * * * *